US011714270B2

(12) United States Patent
Ben-Yakar et al.

(10) Patent No.: US 11,714,270 B2
(45) Date of Patent: Aug. 1, 2023

(54) HIGH-SPEED LASER SCANNING MICROSCOPY PLATFORM FOR HIGH-THROUGHPUT AUTOMATED 3D IMAGING AND FUNCTIONAL VOLUMETRIC IMAGING

(71) Applicant: BOARD OF REGENTS, THE UNIVERSITY OF TEXAS SYSTEM, Austin, TX (US)

(72) Inventors: Adela Ben-Yakar, Austin, TX (US); Ki Hyun Kim, Austin, TX (US); Evan Hegarty, Austin, TX (US); Sertan Kutal Gokce, Austin, TX (US); Sudip Mondal, Austin, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 217 days.

(21) Appl. No.: 16/921,011

(22) Filed: Jul. 6, 2020

(65) Prior Publication Data
US 2020/0333574 A1    Oct. 22, 2020

Related U.S. Application Data

(63) Continuation of application No. 15/547,615, filed as application No. PCT/US2016/015643 on Jan. 29, 2016, now abandoned.
(Continued)

(51) Int. Cl.
*G02B 21/00* (2006.01)
*G06T 15/08* (2011.01)
*H01S 3/101* (2006.01)

(52) U.S. Cl.
CPC ....... *G02B 21/0084* (2013.01); *G02B 21/008* (2013.01); *G02B 21/0048* (2013.01);
(Continued)

(58) Field of Classification Search
CPC ............... G02B 21/00; G02B 21/0004; G02B 21/0016; G02B 21/002; G02B 21/0024;
(Continued)

(56) References Cited

U.S. PATENT DOCUMENTS 5,283,433 A    2/1994 Tsien
5,539,764 A    7/1996 Shields et al.
(Continued)

OTHER PUBLICATIONS

International Search Report and Written Opinion in corresponding PCT/US2016/015643 dated May 31, 2016.
(Continued)

*Primary Examiner* — Thong Q Nguyen
(74) *Attorney, Agent, or Firm* — Meunier Carlin & Curfman LLC

(57) ABSTRACT

A laser scanning system for capturing an image of a specimen is described herein. The laser scanning system includes a light source configured to emit a light beam for illuminating the specimen, a scanning unit including a plurality of reflectors for scanning the light beam along first and second axes, and a data acquisition unit configured to control acquisition of the image. The laser scanning system can include a control circuit configured to receive a reference clock signal for the first reflector and generate a synchronization clock signal based on the reference clock signal. The laser scanning system can include a synchronization controller configured to control the scanning unit and the data acquisition unit. The synchronization controller can be configured to receive the synchronization clock signal, receive a plurality of imaging parameters, and generate a plurality of control signals based on the synchronization clock signal and the imaging parameters.

19 Claims, 13 Drawing Sheets

Related U.S. Application Data

(60) Provisional application No. 62/110,531, filed on Jan. 31, 2015.

(52) U.S. Cl.
CPC ..... *G02B 21/0076* (2013.01); *G02B 21/0088* (2013.01); *G06T 15/08* (2013.01); *H01S 3/101* (2013.01)

(58) Field of Classification Search
CPC ............ G02B 21/0032; G02B 21/0036; G02B 21/0048; G02B 21/0052; G02B 21/0076; G02B 21/008; G02B 21/0084; G02B 21/361; G02B 21/367
USPC .................................................. 359/368–398
See application file for complete search history.

(56) References Cited

U.S. PATENT DOCUMENTS

| | | | |
|---|---|---|---|
| 5,880,880 A | 3/1999 | Anderson et al. | |
| 6,317,258 B1 | 11/2001 | Watanabe | |
| 6,982,824 B2 | 1/2006 | Kei et al. | |
| 7,158,294 B2 | 1/2007 | Motomura et al. | |
| 8,045,262 B2* | 10/2011 | Kishimoto | G02B 21/008 359/368 |
| 8,194,311 B2 | 6/2012 | Kishimoto | |
| 2004/0233457 A1 | 11/2004 | Podoleanu et al. | |
| 2005/0110994 A1 | 5/2005 | Foster et al. | |
| 2006/0197867 A1 | 9/2006 | Johnson et al. | |
| 2009/0097108 A1 | 4/2009 | Fox et al. | |
| 2012/0287949 A1 | 11/2012 | Webb | |
| 2013/0155500 A1 | 6/2013 | Yoshida et al. | |
| 2014/0270471 A1 | 9/2014 | Cao et al. | |

OTHER PUBLICATIONS

Sanderson, M.J. and Parker, I., (2003) Video-rate confical microscopy. Methods in Enzymology, vol. 360, pp. 447-480.

Rajadhyaksha, et al., "Video-rate confocal scanning laser microscope for imaging human tissues in vivo", Applied Optics vol. 38 (10), 1999, pp. 2105-2115.

* cited by examiner

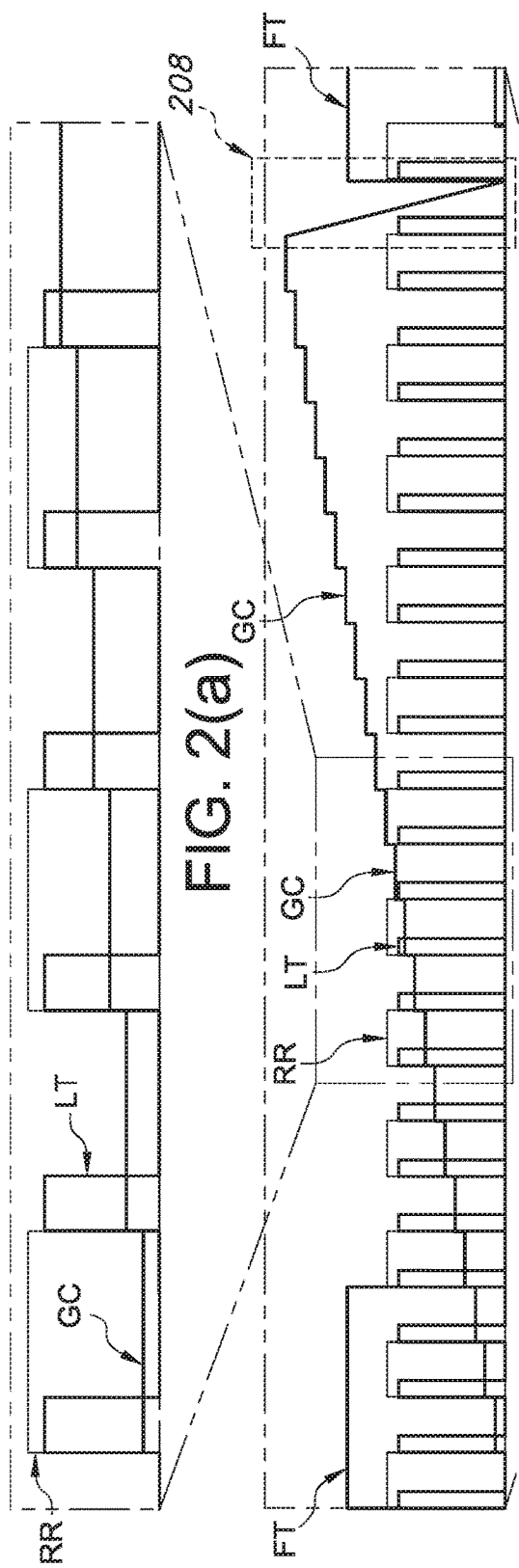
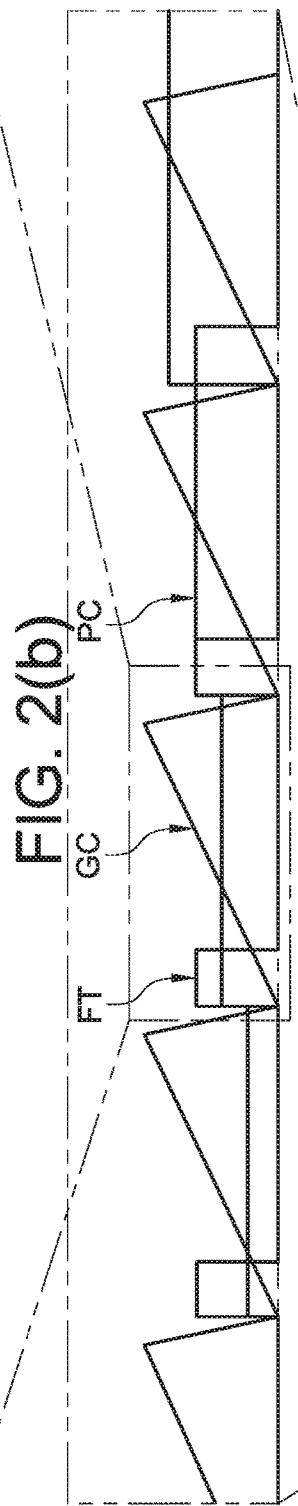
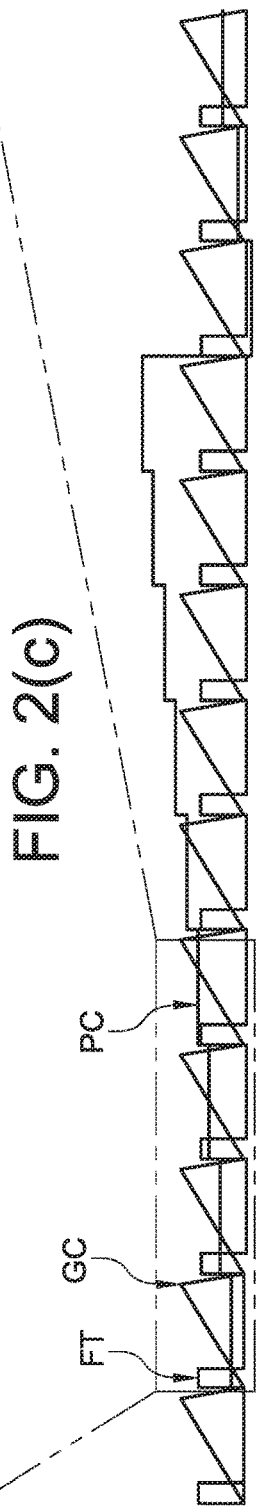
FIG. 2(a)  FIG. 2(b)  FIG. 2(c)  FIG. 2(d)

HIGH-SPEED LASER SCANNING MICROSCOPY PLATFORM FOR HIGH-THROUGHPUT AUTOMATED 3D IMAGING AND FUNCTIONAL VOLUMETRIC IMAGING

CROSS-REFERENCE TO RELATED APPLICATIONS

This is a continuation application of U.S. patent application Ser. No. 15/547,615, filed on Jul. 31, 2017, which is a national stage application filed under 35 U.S.C. § 371 of PCT/US2016/015643 filed Jan. 29, 2016, which claims the benefit of U.S. Provisional Patent Application No. 62/110,531, filed on Jan. 31, 2015, entitled "HIGH-SPEED LASER SCANNING MICROSCOPY PLATFORM FOR HIGH-THROUGHPUT AUTOMATED 3D IMAGING AND FUNCTIONAL VOLUMETRIC IMAGING," the disclosures of which are expressly incorporated herein by reference in their entireties.

STATEMENT REGARDING FEDERALLY FUNDED RESEARCH

This invention was made with Government support under Grant No. R01 AG041135 awarded by the National Institutes of Health. The Government has certain rights in the invention.

BACKGROUND

A confocal laser scanning microscope uses a light beam (e.g., a laser beam) to image a sample. For example, the microscope focuses the light beam on a spot within a plane of the sample. It then scans the light beam across the plane of the sample. In order to capture a volumetric image, the microscope focuses the light beam on and scans the light beam across planes of the sample at various depths.

Both commercial and academic laser scanning microscopes have very limited control or even no control over imaging parameters. The main cause of their limited control is due to purely hardware-based control of the microscopes. For example, purely hardware-based control allows users to choose only predefined parameters that are usually the power of 2, such as 128, 256, 512, and 1024.

For example, the latest resonant confocal microscope from NIKON CORP. of Tokyo, Japan provides only 128, 256, and 512 pixels per line. The resonant confocal microscopes described in Sanderson, M. J. et al., Video-rate confocal microscopy. Methods in Enzymology, 360, 447-481 (2003) allow users to choose 128, 256, 512, and 1024 lines per image, and 128, 256, 512, and 1024 pixels per line, again due to the limitations in their hardware that synchronizes the scanners with the data acquisition. None of these microscopes provide synchronization to z-axis piezo stages to enable rapid 3D volumetric imaging because they do not have the capability to synchronize the motion of the scanning mirrors with the z-axis piezo microscopes. Further, the controllers for these systems would have to be redesigned to implement z-axis piezo synchronization and then could only achieve a limited control.

SUMMARY

A high-speed laser scanning microscope is described herein. Using the synchronization techniques described herein, the laser scanning microscope can provide ultrafast imaging speed, a large field-of-view, and flexible control over the size of the field-of-view ("FOV") and over the available large number of pixels for images. The above characteristics make the laser scanning microscope described herein ideal for high-throughput, automated, 3D imaging of biological specimens. It can especially be useful to image specimens with high aspect ratios since it is possible to choose a large size of the FOV in the long direction and any pixel numbers independently.

Additionally, with the integration of a microfluidic immobilization device, the imaging system can provide ultrafast, high-resolution imaging of living small animal models. For example, the microscope can follow-up regeneration in small animal model, *Caenorhabditis elegans* ("*C. elegans*"), after neuronal injuries and perform time-lapse volumetric imaging of calcium response dynamics of *C. elegans* neurons at the speeds that are not possible in any other existing optical imaging modality.

The described synchronization technique is suitable for fast 3D imaging of most specimens in the fluorescence mode or scattering mode or reflectance mode and can be applied to any linear (e.g., confocal, OCT) or non-linear (two-photon, harmonic generations, etc.) imaging modalities.

A laser scanning system for capturing an image of a specimen is described herein. The laser scanning system can include a light source configured to emit a light beam for illuminating the specimen, a scanning unit including a plurality of reflectors, where a first reflector scans the light beam along a first axis and a second reflector scans the light beam along a second axis, and a data acquisition unit configured to control acquisition of the image of the specimen. The laser scanning system can also include a control circuit configured to receive a reference clock signal for the first reflector and generate a synchronization clock signal based on the reference clock signal. Additionally, the laser scanning system can include a synchronization controller configured to control the scanning unit and the data acquisition unit. The synchronization controller can be configured to receive the synchronization clock signal, receive a plurality of imaging parameters, and generate a plurality of control signals based on the synchronization clock signal and the imaging parameters. A first control signal synchronizes operation of the first and second reflectors of the scanning unit, and a second control signal synchronizes operation of the scanning unit and the data acquisition unit.

The control circuit can be further configured to generate an enhanced reference clock signal from the reference clock signal, and generate the synchronization clock signal from the enhanced reference clock signal. For example, generating the enhanced reference clock signal can include at least one of filtering, regulating the voltage of, suppressing fluctuation of, or supplying current to the reference clock signal. Additionally, the control circuit can include a frequency doubler circuit for generating the synchronization clock signal.

The imaging parameters can include at least one of a number of lines in the image, a number of pixels per line in the image, or a field of view. Optionally, the imaging parameters can further include at least one of a translational device movement range or a number of translational device movement steps. Additionally, the field of view can include a horizontal scan range and a vertical scan range.

Respective periods of the first and second control signals can be approximately equal to one another. For example, a period of the first control signal can be variable based on the number of lines in the image. Alternatively or additionally, a period of the second control signal can be variable based on the number of lines in the image. For example, the respective periods of the first and second control signals can be equal to a period of the synchronization clock signal times the number of lines in the image plus 1.

Alternatively or additionally, an amplitude (or a maximum voltage level) of the first control signal can be variable based on the field of view. Additionally, a level of the first control signal can increase incrementally after each cycle of the synchronization clock signal to the amplitude before returning to a minimum level.

The laser scanning system can further include a translational device for supporting the specimen. For example, the translational device can be configured to move along a third axis. In addition, the plurality of control signals can include a third control signal for synchronizing operation of the scanning unit, the data acquisition unit, and the translational device.

The third control signal can be synchronized with the first and second control signals. Additionally, a period of the third control signal can be variable based on the number of translational device movement steps. For example, the period of the third control signal can be equal to a period of the second control signal times the number of translational device movement steps.

Alternatively or additionally, an amplitude of the third control signal can be variable based on the translational device movement range. Additionally, a level of the third control signal can increase incrementally after each cycle of the second control signal to the amplitude before returning to a minimum level.

Alternatively or additionally, the synchronization controller can be configured to generate a fourth control signal for controlling operation for the first reflector. An amplitude of the fourth control signal can be variable based on the field of view.

The laser scanning system can be at least one of a confocal laser scanning microscope, a multi-photon laser scanning microscope, or an optical coherence tomography.

A control unit for controlling a laser scanning system is also described herein. The control unit can include a control circuit and a synchronization controller. The control circuit can be configured to receive a reference clock signal for the first reflector and generate a synchronization clock signal based on the reference clock signal. Additionally, the synchronization controller can be configured to control the scanning unit and the data acquisition unit. The synchronization controller can be configured to receive the synchronization clock signal, receive a plurality of imaging parameters, and generate a plurality of control signals based on the synchronization clock signal and the imaging parameters. A first control signal synchronizes operation of the first and second reflectors of the scanning unit, and a second control signal synchronizes operation of the scanning unit and the data acquisition unit.

A computer-implemented method for controlling a laser scanning system is also described herein. The method can include receiving a synchronization clock signal, where the synchronization clock signal is based on a reference clock signal for a resonant mirror of the laser scanning system, receiving a plurality of imaging parameters, and generating a plurality of control signals based on the synchronization clock signal and the imaging parameters. A first control signal synchronizes operation of the resonant mirror and a galvanometric mirror of the laser scanning system, and a second control signal synchronizes operation of the resonant and galvanometric mirrors and a data acquisition unit of the laser scanning system.

A microfluidic device for manipulating, housing, and trapping a plurality of specimens for surgery or imaging is also described herein. The microfluidic device can include an inlet for receiving the specimens, an outlet in fluid connection with the inlet, a plurality of immobilization channels extending between the inlet and the outlet, and a perfusion compartment can be arranged between the inlet and the immobilization channels. Each of the immobilization channels can include a plurality of sections, where each respective section has at least one of a different width or height as compared to the other sections.

Alternatively or additionally, each respective section can have a different width and a different height as compared to the other sections.

Optionally, each of the immobilization channels can include at least three sections.

Additionally, each of the immobilization channels can be configured to immobilize and orient at least one of the specimens.

The immobilization channels can extend in a direction between the inlet and the outlet, a width of each of the immobilization channels decreasing in the direction extending between the inlet and the outlet. Alternatively or additionally, a height of each of the immobilization channels can decrease in the direction extending between the inlet and the outlet.

Additionally, the immobilization channels can be arranged substantially in parallel to each other, the immobilization channels reducing net hydraulic resistance for the microfluidic device. For example, the immobilization channels can be arranged with approximately equal spacing between adjacent immobilization channels.

The inlet and outlet can be configured to allow a pressure gradient to be created across the immobilization channels.

Optionally, the microfluidic device can include a plurality of outlets, where a first outlet is in fluid connection with a first subset of the immobilization channels and a second outlet is in fluid connection with a second subset of the immobilization channels.

Optionally, the microfluidic device can include a perfusion inlet and a perfusion outlet in fluid connection with the perfusion compartment. Optionally, the microfluidic device can include a sieve structure arranged between the perfusion compartment and at least one of the perfusion inlet or the perfusion outlet.

Another microfluidic device for manipulating, housing, and trapping a plurality of specimens for surgery or imaging is described herein. The microfluidic device can include an inlet for receiving the specimens, an outlet in fluid connection with the inlet, and a plurality of immobilization channels extending between the inlet and the outlet. Each of the immobilization channels can include a plurality of sections, where each respective section has at least one of a different width or height as compared to the other sections.

A computer-implemented method for imaging of a plurality of specimens trapped within a microfluidic device is also described herein. The method can include receiving a low-magnification image of the microfluidic device with the specimens trapped therein, creating an intensity profile of the low-magnification image, where the intensity profile includes a respective peak intensity pixel value for each row of the low-magnification image, and using the intensity profile, segmenting the low-magnification image into a plurality of segments, where each of the segments includes a respective specimen. The method can also include, for each respective segment, identifying a feature of interest of the respective specimen and determining a center location of the feature of interest, and generating a translational moving sequence for high-magnification imaging based on the center location of the feature of interest of each respective specimen. The feature of interest can be identified based on a plurality of highest intensity pixel values within the respective segment. Optionally, the low-magnification image can be a fluorescent image.

Additionally, the method can include driving a translational device that supports the microfluidic device based on the translational moving sequence, and acquiring a high-magnification volumetric image of each of the specimens.

Optionally, a magnification of the high-magnification volumetric image is at least 5 times greater than a magnification of the low-magnification image.

Alternatively or additionally, the highest intensity pixel values within the respective segment can include the three highest intensity pixel values.

The method can further include calculating respective distances between pairs of the highest intensity pixel values, and comparing the respective distances between the pairs of the highest intensity pixel values. The feature of interest can be identified by a pair of the highest intensity pixel values having a smallest calculated distance. Additionally, the center location of the feature of interest can be determined from the pair of the highest intensity pixel values having the smallest calculated distance.

Optionally, the method can include applying a moving average filter to the low-magnification image, where the intensity profile is created from the filtered low-magnification image.

Optionally, the method can include disregarding at least one of the peak intensity pixel values having a value less than a threshold value. Optionally, the threshold value can be approximately 30% of an average peak intensity pixel value.

It should be understood that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

FIGS. 2(a)-2(d) illustrate various control and synchronization signals generated by an example synchronization controller described herein. The control and synchronization signals include the electrical voltage signals generated by the multifunction DAQ 112 shown in FIG. 1(b). FIG. 2(a) illustrates the frequency doubling from RR to LT, as well as the voltage level (or height) of GC incrementally increasing with each cycle of LT. FIG. 2(b) illustrates one period of FT and GC synchronized with RR and LT. FIG. 2(c) illustrates the voltage level (or height) of PC incrementally increasing with each period of FT and GC. FIG. 2(d) illustrates one period of PC synchronized with FT and GC. In FIGS. 2(a)-2(d), Nline is equal to 23, and Nstep is equal to 10. Thus, one period of FT and GC is equal to 24 periods of LT, and one period of PC is equal to 240 periods of LT (or 10 periods of FT).

FIG. 3(a) illustrates the lateral resolution. FIG. 3(b) illustrates the axial resolution.

FIG. 5(a) is a schematic of the device for C. elegans immobilization (e.g., through inlet $S_{IN}$ and outlet $W_{OUT}$) in an anesthetic free environment for high-resolution volumetric imaging of calcium responses. FIG. 5(b) illustrates an enlarged view of the trapping area 501 with a schematic of a C. elegans oriented with its head upward for chemical delivery channel. FIG. 5(c) is a graph illustrating the stimulus delivery process tested using fluorescein and response from a single neuron fluorescence intensity for calcium response. FIG. 5(d) are fluorescence images of single ASH neuron from CX6632 animal when exposed to 1M glycerol. FIG. 5(e) are fluorescence images of ZIM294 animal when exposed to 1M glycerol stimulus. The fluorescence images were acquired using a CCD camera. Scale bar in FIG. 5(e) is 10 mm.

FIG. 10(a) shows a reconnected axon, and FIG. 10(b) shows non-reconnected axon.

FIG. 13(a) illustrates a set of 24 neurons, which are annotated in the whole animal labeled with NLS::GCaMP and exposed to +10 mM NaCl stimulus for a 30 second period. The annotation numbers increase from the head to the tail from 1, n1 to 18, n6. Neurons 1-18 are responsive, and neurons n1-n6 are non-responsive. FIG. 13(b) illustrates the intensity dynamics plots of the neurons' responses over total time of 240 seconds. The +10 mM NaCl stimulus is applied at 120 second mark for 30 seconds as represented by the gray shade in the plot. The intensity dynamics are normalized by the minimum intensity level of each neuron.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. While implementations will be described with respect to high-speed three-dimensional ("3D") imaging using a confocal laser scanning microscope, it will become evident to those skilled in the art that the implementations are not limited thereto, but are applicable to imaging in the fluorescence, scattering, or reflectance mode using other laser scanning imaging modalities, including but not limited to, linear (e.g., confocal, optical coherence tomography, etc.) or nonlinear (e.g., multi-photon, harmonic generation, etc.) imaging modalities.

Figure 1A:
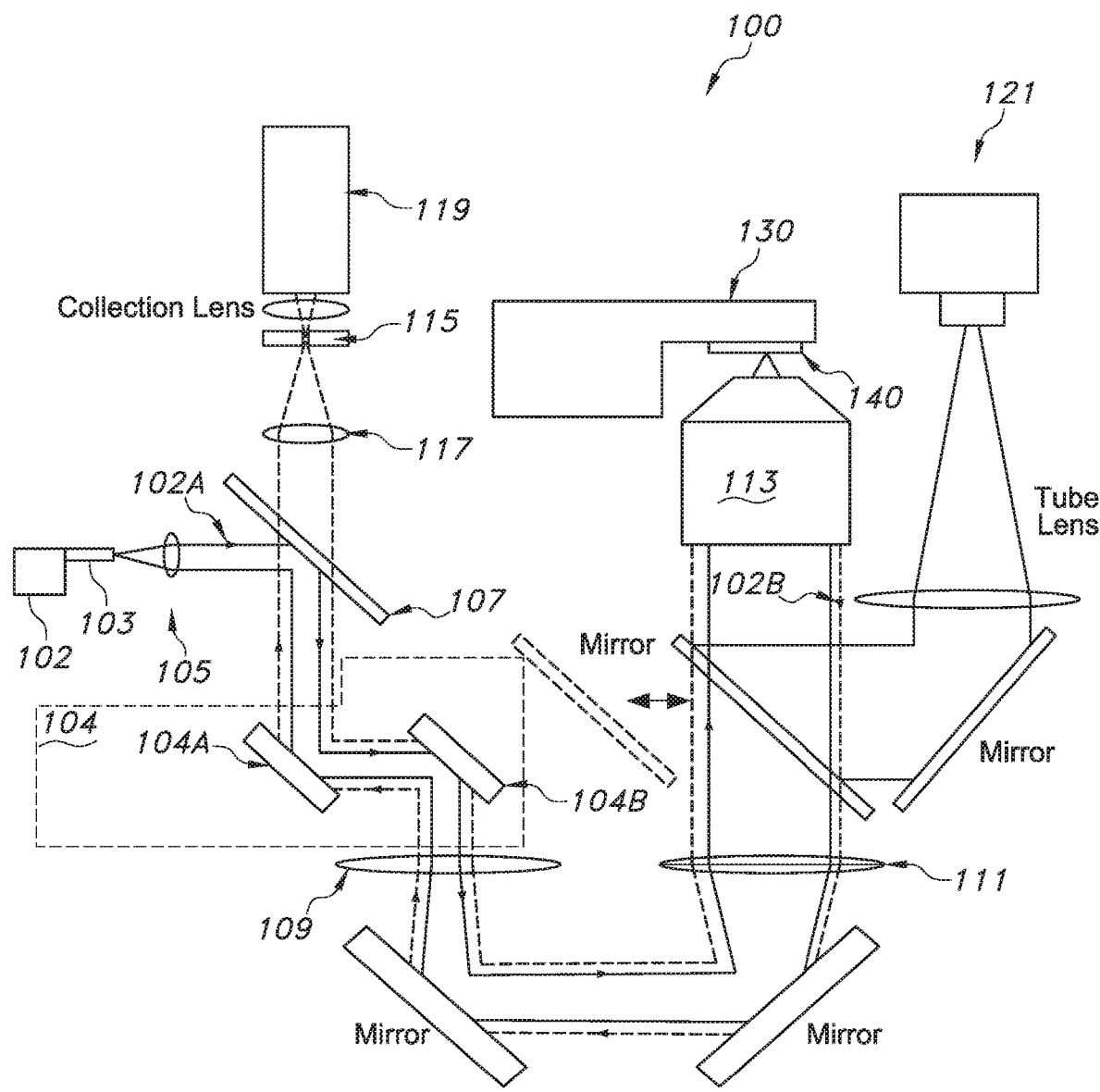
FIG. 1(a) is a schematic diagram illustrating an example confocal laser scanning microscope.

Referring now to FIG. 1(a), a schematic diagram illustrating an example confocal laser scanning microscope 100 is shown. As described below, the confocal laser scanning microscope 100 shows the fastest imaging speed compared to any other laser scanning confocal and multi-photon microscopes. A confocal laser scanning microscope uses a light beam (e.g., a laser beam) to image a sample *C. elegans*, which is also referred to herein as a "worm"). The confocal laser scanning microscope 100 can include an excitation light source 102 configured to emit a light beam 102A for illuminating a sample or specimen 140. The specimen 140 can be supported on a translational device 130. The translational device 130 can be translated or moved in one or more directions by one or more actuators (not shown). For example, in one implementation, the translational device 130 can be translated in three directions, for example, the x-, y- and z-directions, which are all orthogonal to each other. In one implementation, the translational device 130 can be a piezo-stage device, e.g., the translation device 130 can be translated by piezoelectric actuators. It should be understood that using piezoelectric actuators to translate the translational device 130 is provided as only one example and that the translation device 130 can be translated using other means, including but not limited to, a stepper motor.

In FIG. 1(a), a propagation path of the light beam 102A is shown by solid lines. As described below, the specimen 140 can be one or more *C. elegans*, but it should be understood that the specimen 140 should not be limited to the examples below. The light source 102 can be a continuous wave ("CW") solid-state laser with a 488 nm wavelength (e.g., SPECTRA PHYSICS, CYAN 488 of NEWPORT CORP. of Irvine, Calif.), which excites the green fluorescent protein ("GFP") efficiently. The light beam 102A can be coupled into one end of a single mode optical fiber 103 (e.g., P1-460B-FC-5 of THORLABS, INC. of Newton, N.J.) and can exit the other end of the optical fiber 103. The light beam 102A can be collimated, for example, to a 4 mm cross-section diameter collimated beam by an aspherical collimation lens 105 (e.g., C560TME-A, f=13.86 mm of THORLABS, INC. of Newton, N.J.). The collimated beam can be reflected by a dichroic mirror 107 (e.g., MD499 of THORLABS, INC. of Newton, N.J.), and then, scanned by a scanning unit 104. The scanning unit 104 can include a plurality of reflectors, for example, a first reflector 104A configured to scan the light beam 102A along a first axis and a second reflector 104B configured to scan the light beam 102A along a second axis. The first and second axes can be orthogonal to one another, for example, the first axis and second axis can optionally be the x-axis and y-axis relative to a plane in the specimen 140. In one implementation, the first reflector 104A can be a resonant mirror (e.g., CRS 8 KHz of CAMBRIDGE TECHNOLOGY, INC. of Lexington, Mass.) for the X-scanner (e.g., the fast axis), and the second reflector 104B can be a galvanometric mirror (e.g., 6215H of CAMBRIDGE TECHNOLOGY, INC. of Lexington, Mass.) for the Y-scanner (e.g., the slow axis). The scanned light beam can be relayed and enlarged, for example, to 13.2 mm in diameter (i.e., 3.3×) by a scan lens 109 (e.g., AC508-075-A, f=75 mm of THORLABS, INC. of Newton, N.J.) and a tube lens 111 (e.g., AC508-250-A, f=250 mm of THORLABS, INC. of Newton, N.J.) pair. The enlarged beam can be focused onto the specimen 140 by, for example, a 40× objective lens 113 (e.g., 1.3NA, CF SUPER FLUOR of NIKON CORP. of Tokyo, JP), and can excite the GFPs inside the specimen 140.

The excited GFPs inside the specimen 140 can emit fluorescent photons, which can be collected by the objective lens 113. The collected photons 102B travel backwards to the dichroic mirror 107 through the propagation path of the light beam 102A. In FIG. 1(a), a propagation path of the collected photons 102B is shown by dashed lines. The collected photons 102B can pass through the dichroic mirror 107, and then, are focused onto a pinhole 115 (e.g., P15S, 15 um diameter of THORLABS, INC. of Newton, N.J.) by a pinhole lens 117 (e.g., AC254-75-A, f=75 mm of THORLABS, INC. of Newton, N.J.). The pinhole 115 allows only the in-focus photons to pass while blocking the out-of-focus photons. The in-focus photons can then be collected into a photomultiplier tube ("PMT") 119 (e.g., PMT, H10770PA-40 of HAMAMATSU PHOTONICS K.K. of Hamamatsu, JP).

The PMT 119 can convert the collected photons into electric currents, which can be conveyed to a high-speed transimpedance amplifier ("preamp", not shown) (e.g., preamp, FEMTO DHPCA-100 of ELECTRO OPTICAL COMPONENTS, INC. of Santa Rosa, Calif.). The preamp can convert and amplify the currents into voltage. The voltage output can be sampled, for example, into 16-bit data by a high-speed data acquisition card ("DAQ") (ATS9462 of ALAZAR TECHNOLOGIES, INC. of Pointe-Claire, QC, Canada) (e.g., the multifunction DAQ 112 of FIG. 1B). The sampled data can be processed and reconstructed into two-dimensional ("2D") images using custom software, for example, software written with LABORATORY VIRTUAL INSTRUMENT ENGINEERING WORKBENCH ("LabVIEW") of NATIONAL INSTRUMENTS CORP. of Austin, Tex. The 2D images can be displayed on a display device and/or saved in a storage device upon request.

The confocal laser scanning microscope 100 can also include a sensor camera 121 (e.g., Model 8050 of THORLABS, INC. of Newton, N.J.). The sensor camera 121 can be configured to capture a low-magnification image of the specimens 140 supported by the translational device 130, for example. The low-magnification image can be a fluorescence image.

Figure 1B:
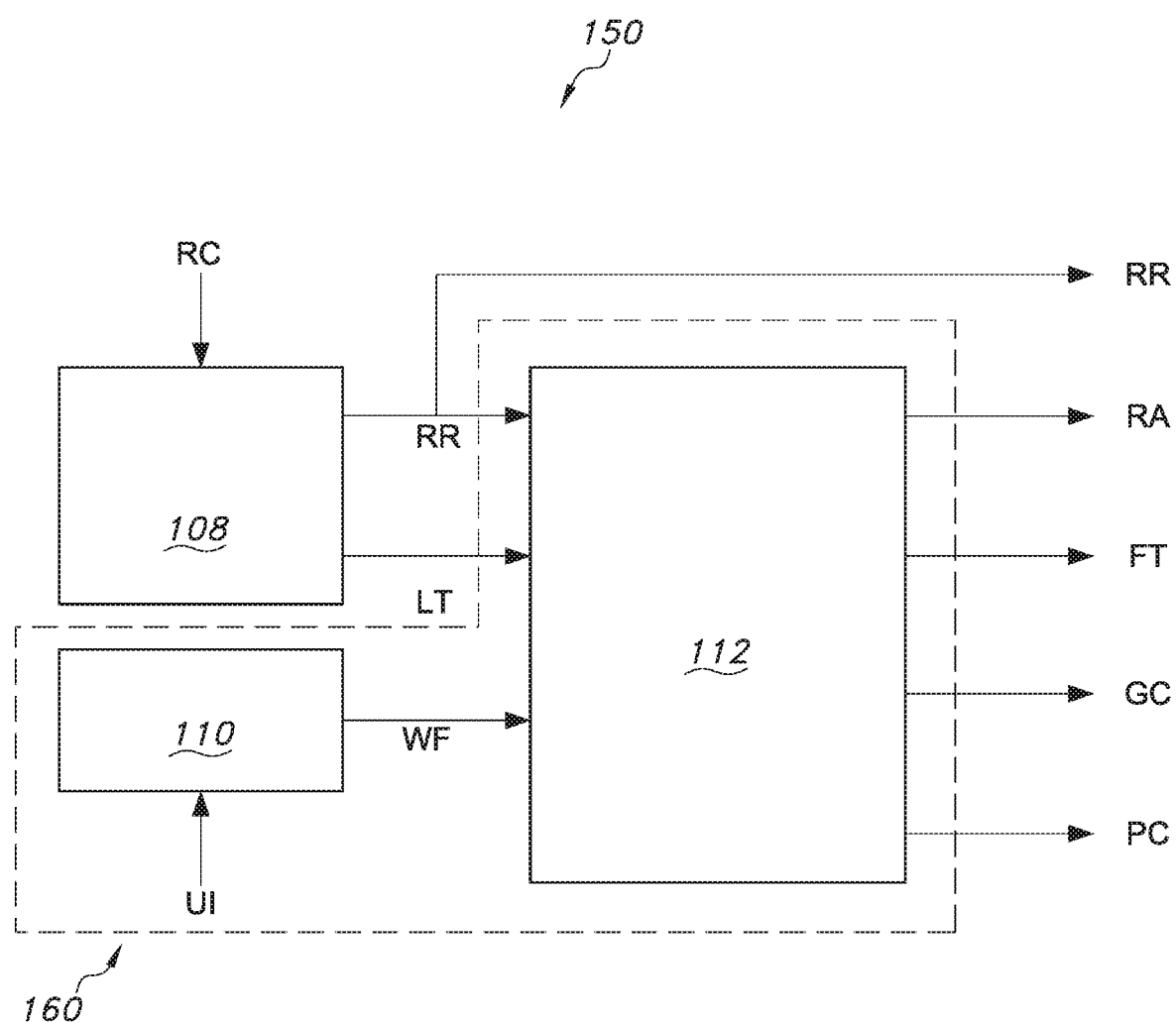
FIG. 1(b) is a block diagram of a control unit for controlling operations of the example confocal laser scanning microscope.
Figure 3A:
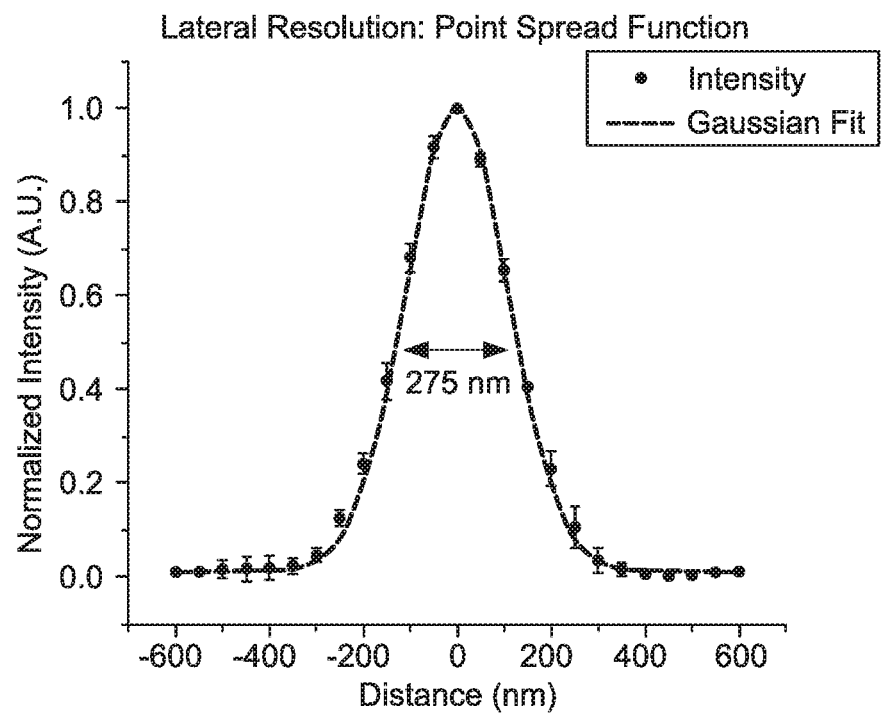
FIGS. 3(a)-3(b) illustrate the point spread function graphs of the example confocal laser scanning microscope described with reference to FIGS. 1(a)-1(b).
Figure 3B:
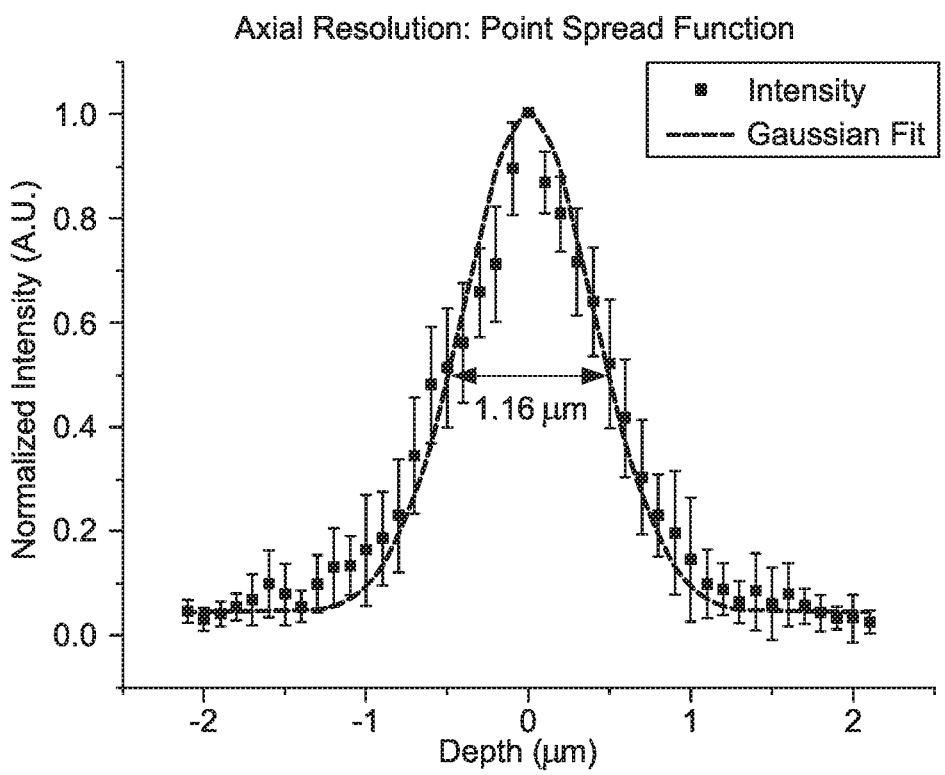
Figure 4:
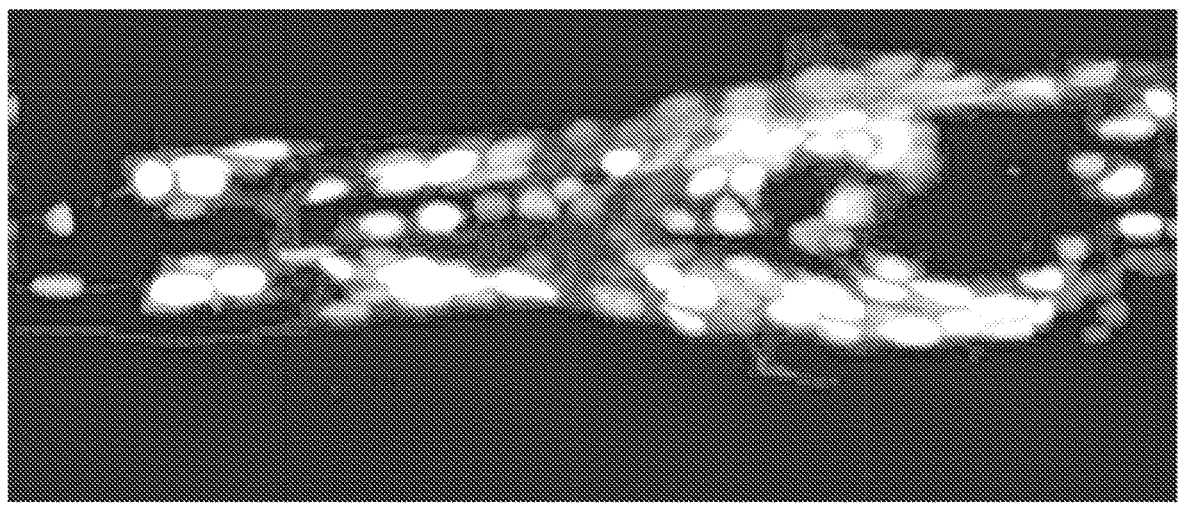
FIG. 4 illustrates the maximum intensity projection of a high-resolution confocal 3D image taken by the example confocal laser scanning microscope described with reference to FIGS. 1(a)-1(b). The field-of-view is 150 um×50 um, and the pixel number is 3000×1000.

Referring now to FIG. 1B, a block diagram of a control unit 150 for controlling operations of the confocal laser scanning microscope 100 of FIG. 1(a) is shown. It should be understood that the control unit 150 can be used for controlling operations of laser scanning systems used with other imaging modalities. The control unit 150 can take advantage of the fastest scanning speed that the resonant scanning mirror (e.g., the first reflector 104A of FIG. 1(a)) can potentially achieve and can provide ultimately flexible control of the scanning operations to meet the requirements for various scanning applications. The control unit 150 includes a control circuit 108, an imaging parameter control unit 110 and a multifunction DAQ 112. As used herein, a synchronization control unit 160 can include (and can be configured to perform one or more functions of) the imaging parameter control unit 110 and/or the multifunction DAQ 112. The control unit 150 receives a plurality of input signals and generates a plurality of internal and output signals, which are referred to herein as control and synchronization signals. The control and synchronization signals are illustrated in FIGS. 2(a)-2(d). As shown in FIG. 1B, the control unit 150 receives a reference clock signal ("RC") that is used to drive a resonant mirror (e.g., the first reflector of FIG. 1(a)) and a user input signal ("UI"). UI can include a plurality of imaging parameters, which can optionally be selected and/or entered by a user of the confocal laser scanning microscope. For example, the imaging parameters can include at least one of a number of lines in the image, a number of pixels per line in the image, or a field of view (e.g., horizontal (or x-axis) scan range and vertical (or y-axis) scan range), a translational device (or z-axis) movement range, or a number of translational device movement steps. The internal signals generated by the control unit 150 include a line trigger signal or synchronization clock signal ("LT") that is generated based on RC, and a plurality of waveforms ("WF") that are generated based on UI for use by the multifunction DAQ 112 to generate the output signals. The output signals include an enhanced reference clock signal ("RR"), a galvanometric mirror control signal or first control signal ("GC"), a frame trigger signal or second control signal ("FT"), a translational device control signal or third control signal ("PC"), and a resonant mirror scanning angle control signal or fourth control signal ("RA"). As shown in FIG. 1B and described in detail below, the control circuit 108 receives RC, enhances RC into RR, converts RC into LT, and transmits RR and LT to the multifunction DAQ 112. Additionally, the synchronization controller 160 generates WF based on UI, and transmits WF to the multifunction DAQ 112. After receiving RR, LT, and WF, the multifunction DAQ 112 generates GC, FT, PC, and RA.

Reference Clock Signal of a Resonant Mirror ("RC")

RC is an electrical signal used by a controller or driver for a resonant mirror (e.g., the first reflector of FIG. 1(a)). RC oscillates between high and low states to control operation of the resonant mirror. RC marks the beginning of each tilting cycle of the resonant mirror. RC is the electrical voltage signal provided by the resonant mirror driver electronics. RC can optionally follow the Transistor-Transistor Logic ("TTL") digital signal standard where a voltage between 0 V and 0.8 V represents the off-state and a voltage between 2 V and 5 V represents the on-state. The quality of RC can be lower than the expected standard due to the quality of the resonant mirror driver electronics or electrical noise from the surroundings, hence, RC can be enhanced using the control circuit 108 as described below.

Enhanced Reference Clock Signal ("RR")

RR is an electrical signal generated by the control circuit 108 by enhancing RC. Optionally, RR strictly adheres to the TTL digital signal standard, and thus, delivers superior reliability as compared to RC. In the same manner as RC, RR marks the beginning of each tilting cycle of the resonant mirror. RR has a duty cycle of 50%, which means 50% of one period is in the on-state (e.g., approximately 5 V), and the other 50% of one period is in the off-state (e.g., approximately 0 V). The on-state and the off-state represent resonant mirror scanning directions opposite to each other. RR is illustrated in FIG. 2(a).

The control circuit 108 can enhance RC into RR and can generate LT by processing RR. The control circuit 108 enhances RC by at least one of the following: filtering the undesirable noise, regulating the maximum and minimum voltages of RC, suppressing the unwanted minor signal fluctuation in RC, or supplying more current to RC. The enhancement makes RR a more reliable, robust, and clean signal, optionally adhering to the TTL digital signal standard, as compared to RC. In one implementation, multiple non-inverting buffer logic gates connected in parallel can be used to accomplish the enhancement. It should be understood that other structures and techniques can be used to enhance RC and that the multiple non-inverting buffer logic gates are provided only as an example.

Line Trigger Signal or Synchronization Clock Signal ("LT")

LT is an electrical signal generated by the control circuit 108 based on RC. In particular, after enhancing RC into RR, the control circuit 108 can generate LT using a frequency doubler circuit. The frequency doubler circuit generates a short, square pulse when RR transitions either from off-state to on-state (i.e., a rise) or from on-state to off-state (i.e., a fall). This is illustrated in FIG. 2(a). The train of the short square pulses comprises LT. In one implementation, the frequency doubler circuit can include multiple non-inverting buffer logic gates, multiple capacitors, and one XOR logic gate. The non-inverting buffer logic gates and the capacitors introduce a delay to RR. The original RR without the delay and the RR with the delay are sent to the two input terminals of the XOR logic gate. It should be understood that other structures and techniques can be used to double the frequency of RR and that the multiple non-inverting buffer logic gates, multiple capacitors, and one XOR logic gate are provided only as an example.

LT marks the beginning of each line scan along a first axis (e.g., the x-axis). For example, LT comprises a short, square pulse when RR transitions from off-state to on-state and vice versa and the respective states represent scanning in opposite directions along the first axis. LT therefore marks the timing to synchronize operations of the resonant mirror (e.g., the first reflector 104A of FIG. 1(a)) and the galvanic mirror (e.g., the second reflector 104B of FIG. 1(a)). LT is generated by the control circuit 108 by processing RR. LT can adhere to the TTL digital signal standard. As described further below, LT serves as the reference timing clock for GC (or the first control signal), FT (or the second control signal), and PC (or the third control signal). LT is illustrated in FIG. 2(a).

User Input Signal ("UI")

UI is a collection of various parameters selected by a user of the confocal laser scanning microscope. This allows the user to flexibly control the imaging parameters of the confocal laser scanning microscope. The imaging parameters can include the specifics of the objective lens (e.g., the objective lens 113 of FIG. 1(a)), the target field-of-view ("FOV") of the scanning operations, the desired pixel number of the image, the specifics of the depth scanning operations, and the wavelength ($\lambda_{ex}$) of the excitation light source (e.g., the light source 102 in FIG. 1(a)). The specifics of the objective lens can include the magnification, the manufacturer, the imaging medium, and the numerical aperture ("NA"). The target FOV can include the horizontal scanning range (also referred to herein as "x-range") and the vertical scanning range (also referred to herein as "y-range"). The desired pixel number of the image can include a number of pixels per line in the image ("Npixel") and a number of lines in the image (also referred to herein as "Nline"). The specifics of the depth of scanning operations can include a translational device movement range (also referred to herein as "z-range"), a translational device movement step size (also referred to herein as "z-step"), and a number of translational device movement steps (also referred to herein as "Nstep").

The imaging parameter control unit 110 is configured to compute waveforms ("WF") based on UI, which are used by the multifunction DAQ 112 to generate the electrical signal outputs, e.g., GC, FT, PC, and RA, shown in FIG. 2. All of the waveforms use Nline as the unit for the length of the respective waveform. The multifunction DAQ 112 is configured to generate the output electrical voltage signals based on WF provided by the imaging parameter control unit 110 and RR and LT provided by the control circuit 108. The multifunction DAQ 112 can use RR as the start trigger. The multifunction DAQ 112 can begin generating the output electrical voltage signals only when the multifunction DAQ 112 detects the rise state transition, i.e., off-state to on-state, in RR. The multifunction DAQ 112 can use LT as the reference timing clock for signal generation.

Galvanometric Mirror Control Signal or First Control Signal ("GC")

GC is an electrical signal that can be used to control or drive a galvanometric mirror (e.g., the second reflector 104B of FIG. 1(a)). GC can be used to synchronize operation of the resonant and galvanometric mirrors (e.g., the first and second reflectors 104A, 104B of FIG. 1(a)). GC can control the tilting angle of the galvanometric mirror. GC can have a sawtooth waveform shape as shown in FIGS. 2(b)-2(d). The voltage of GC can have both positive and negative values. For example, the positive voltage can turn the galvanometric mirror clockwise, and the negative voltage can turn the galvanometric mirror counter-clockwise. A maximum voltage of GC (also referred to herein as "amplitude" of GC) is variable based on the FOV, in particular the maximum voltage can vary based on y-range. In particular, the maximum voltage of the GC waveform is determined by the manufacturer of the objective lens, the magnification of the objective lens, and the vertical scanning range (y-range). The amplitude of the GC waveform is linearly proportional to the magnification of the objective lens and y-range. The manufacturer of the objective lens provides the compensation factor for the amplitude of the GC waveform because the focal length of the objective lens slightly varies according to the manufacturer due to the difference in the manufacturers' objective lens designs. This is described with reference to RA below. As described above, GC can be generated by the multifunction DAQ 112 of FIG. 1B as an electrical voltage signal.

GC can be a sawtooth waveform. The period of GC can be variable based on the number of lines in the image (Nline). The period of GC can be the same as the period of FT, which can also be variable based on Nline. The period of GC can be linearly proportional to Nline. For example, the period of GC can be equal to a period of LT times (Nline+1). This is shown in FIG. 2(b), where Nline=23, i.e., the period of GC equals 24 periods of LT. The 1 added to Nline is the fly-back time for the galvanometric mirror to return to its initial position after completing one period. This is shown by the dotted box 208 in FIG. 2(b). As shown in FIGS. 2(a)-2(b), the voltage level (or height of the waveform) incrementally increases after each cycle of LT. The increment of the GC waveform is the result of dividing the amplitude of the GC waveform by (Nline−1). One incremental increase of the voltage level of GC occurs for every LT period as shown in FIG. 2(a). The number of incremental increase of the voltage level of GC is (Nline−1) before the voltage level returns to a minimum level.

Frame Trigger Signal or Second Control Signal ("FT")

FT is an electrical signal that determines the beginning of each frame. In other words, FT signals the multifunction DAQ 112 for imaging when the data acquisition of a new frame has to commence. FT can be a square pulse train adhering to the TTL digital signal standard. The duty cycle of FT can be any value between 5% and 50%, for example the duty cycle of FT can be set to 10%. The period of FT can be variable based on the number of lines in the image (Nline). The period of FT can be the same as the period of GC, which can also be variable based on Nline. The period of FT can be linearly proportional to Nline. For example, the period of FT can be equal to a period of LT times (Nline+1). This is shown in FIG. 2(b), where Nline=23, i.e., the period of FT equals 24 periods of LT. FT can be generated by the multifunction DAQ 112 of FIG. 1B as an electrical voltage signal.

Translational Device Control Signal or Third Control Signal ("PC")

PC is an electrical signal that directs the position of a translational device (e.g., the translational device 130 of FIG. 1(a)). As discussed above, the translational device can be a piezo-stage device that can be translated using piezoelectric actuators. Accordingly, the position of the translational device can be linearly proportional to the voltage of PC. The voltage of PC can have a sawtooth waveform shape. The period of PC can be variable based on the number of translational device movement steps (Nstep). The period of PC can be linearly proportional to Nstep. For example, the period of PC can be equal to a period of LT times (Nline+1) times Nstep. This is shown in FIG. 2(d), where Nline=23 and Nstep=10, i.e., the period of PC equals 240 periods of LT (or 10 periods of GC and FT). The voltage of PC can have a positive value or be 0. The maximum voltage of PC (or "amplitude" of the PC waveform) is proportional to the translational device moving range (z-range). As shown in FIGS. 2(c)-2(d), the voltage level of PC (or height of the waveform) incrementally increases after each cycle of GC and/or FT. The increment of the PC waveform is the result of dividing the amplitude of the PC waveform by (Nstep−1). One incremental increase of the voltage level of PC occurs for every GC and/or FT period as shown in FIG. 2(d). The number of incremental increase of the voltage level of GC is (Nstep−1) before the voltage level returns to a minimum level. PC can be generated by the multifunction DAQ 112 of FIG. 1B as an electrical voltage signal.

Resonant Mirror Scanning Angle Control Signal or Fourth Control Signal ("RA")

RA is an electrical signal that determines the scanning angle of the resonant mirror (e.g., the first reflector of FIG. 1(a)). RA can be a constant DC voltage. The scanning angle of the resonant mirror is linearly proportional to the voltage of RA. In other words, the higher the voltage of RA, the larger the scanning angle of the resonant mirror. The value of RA is determined by the manufacturer of the objective lens, the magnification of the objective lens, and the horizontal scanning range (x-range). The value of RA is linearly proportional to the magnification of the objective lens and x-range. The manufacturer of the objective lens decides the compensation factor for the RA value because the focal length of the objective lens slightly varies according to the manufacturer due to the difference in the manufacturers' objective lens designs. RA can be generated by the multifunction DAQ 112 of FIG. 1B as an electrical voltage signal.

High-Speed Functional Volumetric Imaging of Calcium Response Dynamics in *C. elegans*

Figures 5A, 5B, 5C:
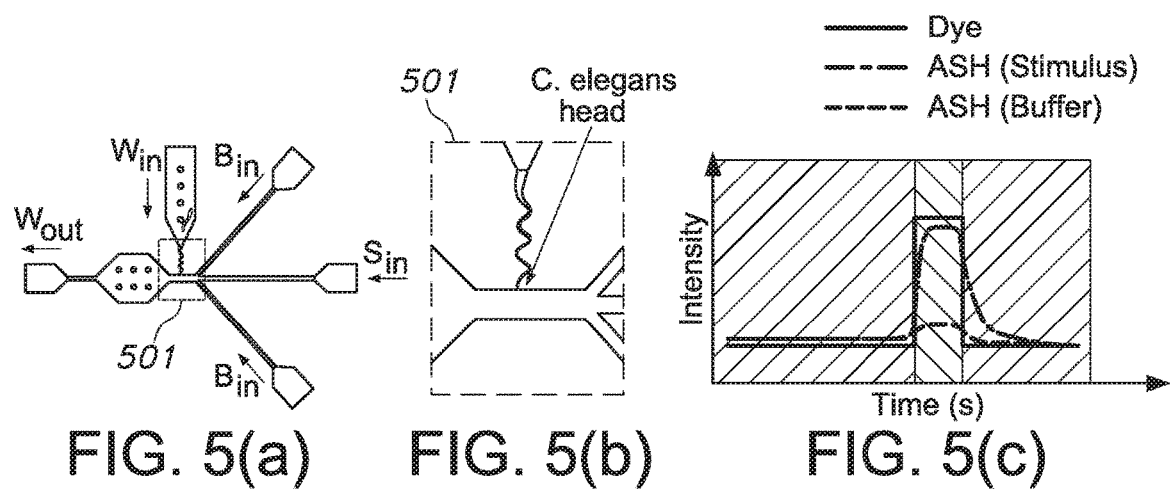
FIGS. 5(a)-5(e) illustrate a microfluidic device for C. elegans immobilization and stimulus delivery for calcium imaging.
Figures 5D, 5E:
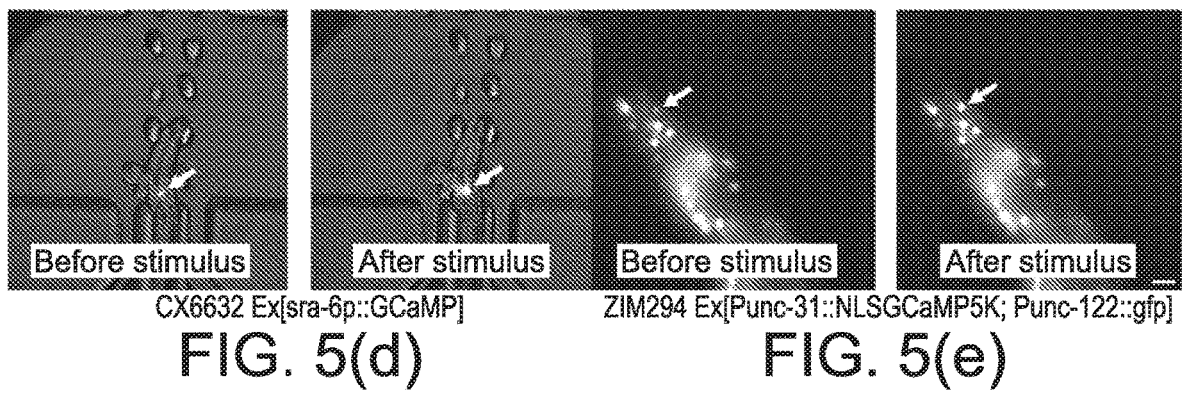

FIGS. 5(*a*)-5(*e*) illustrate a microfluidic device for *C. elegans* immobilization and stimulus delivery for calcium imaging. FIG. 5(*a*) is a schematic of the device for *C. elegans* immobilization (e.g., through inlet $S_{IN}$ and outlet $W_{OUT}$) in an anesthetic free environment for high-resolution volumetric imaging of calcium responses. FIG. 5(*b*) illustrates an enlarged view of the trapping area with a schematic of a *C. elegans* oriented with its head upward for chemical delivery channel. FIG. 5(*c*) is a graph illustrating the stimulus delivery process tested using fluorescein and response from a single neuron fluorescence intensity for calcium response. FIG. 5(*d*) are fluorescence images of single ASH neuron from CX6632 animal when exposed to 1M glycerol. FIG. 5(*e*) are fluorescence images of ZIM294 animal when exposed to 1M glycerol stimulus. The fluorescence images were acquired using a CCD camera. Scale bar in FIG. 5(*e*) is 10 mm.

Chemicals

All chemicals were purchased from THERMO FISHER SCIENTIFIC, INC. of Waltham, Mass. for worm maintenance. Sylgard 184 was obtained from DOW CORNING CORP. or Midland, Mich. (Tridecafluoro-1,1,2,2-tetrahydrooctyle) trichlorosilane was purchased from GELEST, INC. of Morrisville, Pa. Glycerol was purchased from SIGMA-ALDRICH of St. Louis, Mo. Freshly prepared S. basal was used as a buffer for *C. elegans* imaging inside microfluidic chip. Glycerol was dissolved in S. basal to prepare 1 M solution for osmolarity stimulus.

Device Fabrication

The device was designed on silicon wafers using a negative photo resist SU8-2025. A spin coated layer of 35 μm SU8 was exposed using high-resolution photomask with the design shown in FIG. 5(*a*). The layer was developed and hard baked to be used for PDMS molding. The mold was vapor coated with silane for ~6 hours to help release the mold during peeling process. PDMS was mixed in 10:1 ratio, mixed well, and degassed in vacuum chamber to get rid of bubbles. PDMS was poured on the SU8 features and baked at 70° C. for 2 hours. PDMS layer was peeled off from silicon wafer, cut into small pieces, and punched for access holes. PDMS piece was cleaned in alcohol and blow dried. A clean cover glass of 150 mm thickness and the PDMS piece was treated with 100 W oxygen plasma and irreversibly bonded to each other. Additional 2 hour of baking improves the surface adhesion during high pressure device operation.

*C. elegans* Strain

*C. elegans* strain were grown on nematode growth medium ("NGM") at 20° C. and using standard protocol. ZIM294 Ex[Punc-31::NLSGCaMP5K; Punc-122::gfp] strain was used with GCaMP expressed in nucleus of all neuronal cells using unc-31 promoter. The stain was picked under the stereoscope by visualizing GFP signal from six coelomocyte cells of the animal. Age synchronized animals are obtained by bleaching gravid *C. elegans* and allowing them to hatch in M9 solution for 24 hours. Hatched L1s are plated on NGM plates to obtain larval stage 4 (L4) animals for imaging.

Worm Imaging Inside Stimulation Device

A freshly prepared stimulation device is opened and coupled to a S. basal filled syringe using a metal coupler at In1. In FIG. 5(*a*), all other three ports are blocked using metal plugs. The device is primed with pressurized S. basal solution to get rid of all air bubbles in the device. A single GFP labelled ZIM294 animal is picked in the syringe and pushed thought inlet In of the stimulation device. The animal is pushed inside the narrow trapped with its head up into the trap till the nose is exposed into the stimulation exposure region (see FIG. 5(*b*)). GFP fluorescence signal is acquired from the immobilized animal and pre-exposed to the blue light for 2 minutes to capture the basal fluorescence signal level from all the neurons of interest. Field of view ("FOV") is adjusted to capture majority of the *C. elegans* neurons. Glycerol solution in S. basal of 1 M is flushed though inlet In2 and outlet Out2 to expose animals with 1 M glycerol for 5 seconds. All the neurons are recorded within 700 μm×50 μm FOV and 20 z-stack images with every 1.5 mm. High-speed volumetric imaging was recorded for 2 min with 3 volume per second.

Neuronal Segmentation and Calcium Dynamics

Individual neurons were identified in a custom graphical user interface ("GUI") that encodes centroid value for each neuronal cell nuclei. The GUI tracks the volume of the GFP envelope for the same nucleus at multiple time points in the volumetric imaging sequence. Average fluorescence envelope is calculated for different time points. The relative difference $\Delta F/F_0$ is plotted at all times for every nuclei to measure functional correlation between different neuronal cells.

Results:

Stimulation Imaging Chip for Volumetric Calcium Dynamics

*C. elegans* has total 302 neurons which connects among themselves to form a fair enough complex neuronal network. Function of these neurons are associated with calcium flux changes which can be monitored in vivo using fluorescent proteins. Genetically modified animals with protein molecules (GCaMP) that has calcium binding domains can demonstrate fluorescent changes on calcium amount within cell. Conventionally calcium dynamics are monitored using cell specific expression of GCaMP that depicts the dynamics from a predefined neurons and the neurons defined by the promoter driven expressions. In order to track dynamics from a wide range of neurons involved in one or more circuit, researchers have developed pan neuronal expression of fluorescent protein markers that show all 302 neurons. In those animals it becomes hard to distinguish single neurons from the whole ganglia where many neurons are present at high enough density. Currently, new strains are generated that has more localized fluorescence signal from proteins from the nucleus. These animals has localized fluorescence signal from ~2 um nuclear volume and do not show the complex neuronal processes.

Fluorescent signals are emitted from many nuclei present in the head and is difficult to resolve spatially in 3D using wide-field microscope. A confocal microscope with ~2 um axial resolution and ~1 um lateral resolution can resolve all the nuclei present at high enough density within all stages of *C. elegans*.

Figure 12:
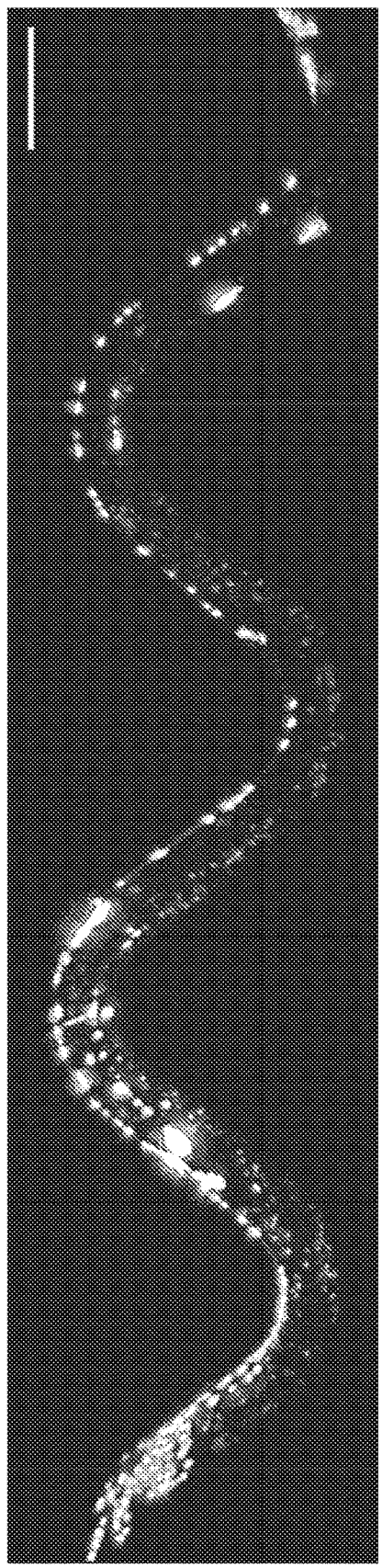
FIG. 12 illustrates an example fluorescent image of the whole animal immobilized inside an example microfluidic device described herein. The image is a maximum intensity z projection of fluorescent confocal images of a whole L4 C. elegans animal. The whole animal is successfully accommodated in the field-of-view of 630×150 μm² inside the microfluidic device. The scale bar is 50 μm.

FIG. 12 shows a sample image of the whole animal immobilized inside the stimulation imaging chip. The specific channel design of the stimulation imaging chip successfully accommodates the whole animal from the head to the tail within the confocal microscope field-of-view (FOV) of 630×150 µm². The sharpness in the neuronal boundaries demonstrates complete immobilization of the L4 stage *C. elegans* inside the stimulation imaging chip.

Volumetric time-lapse confocal imaging of whole animal was conducted to demonstrate the described confocal system's capability to image whole nervous system in real-time. A L4 *C. elegans* was immobilized in the stimulation imaging chip, and high-resolution confocal images of the whole animal were taken with optimum spatial resolution for neuronal identification and annotation. The high-resolution imaging condition was a 630×150×35 µm³ volume imaged with 4200×1000×70 voxels. Afterwards, the volumetric time-lapse imaging was carried out for 240 seconds. The volumetric time-lapse imaging condition is a volume of 630×150×25 µm³ imaged with 2100×500×15 voxels at 2 volumes per second (VPS) speed. For the first 120 seconds, stimulus was not applied to the animal. At 120 second mark, a +10 mM NaCl stimulus was applied for 30 seconds. Subsequently, the stimulus was stopped at 150 second mark, and the animal was imaged for the remaining 90 seconds.

Figure 13A:
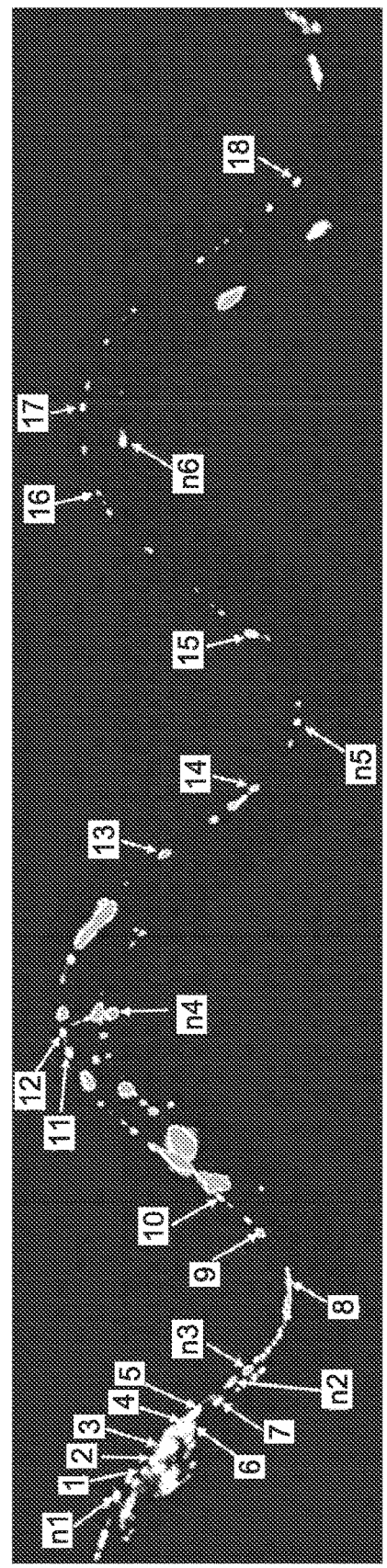
FIGS. 13(a)-13(b) illustrate the intensity dynamics of neuronal responses to +10 mM NaCl stimulus.
Figure 13B:
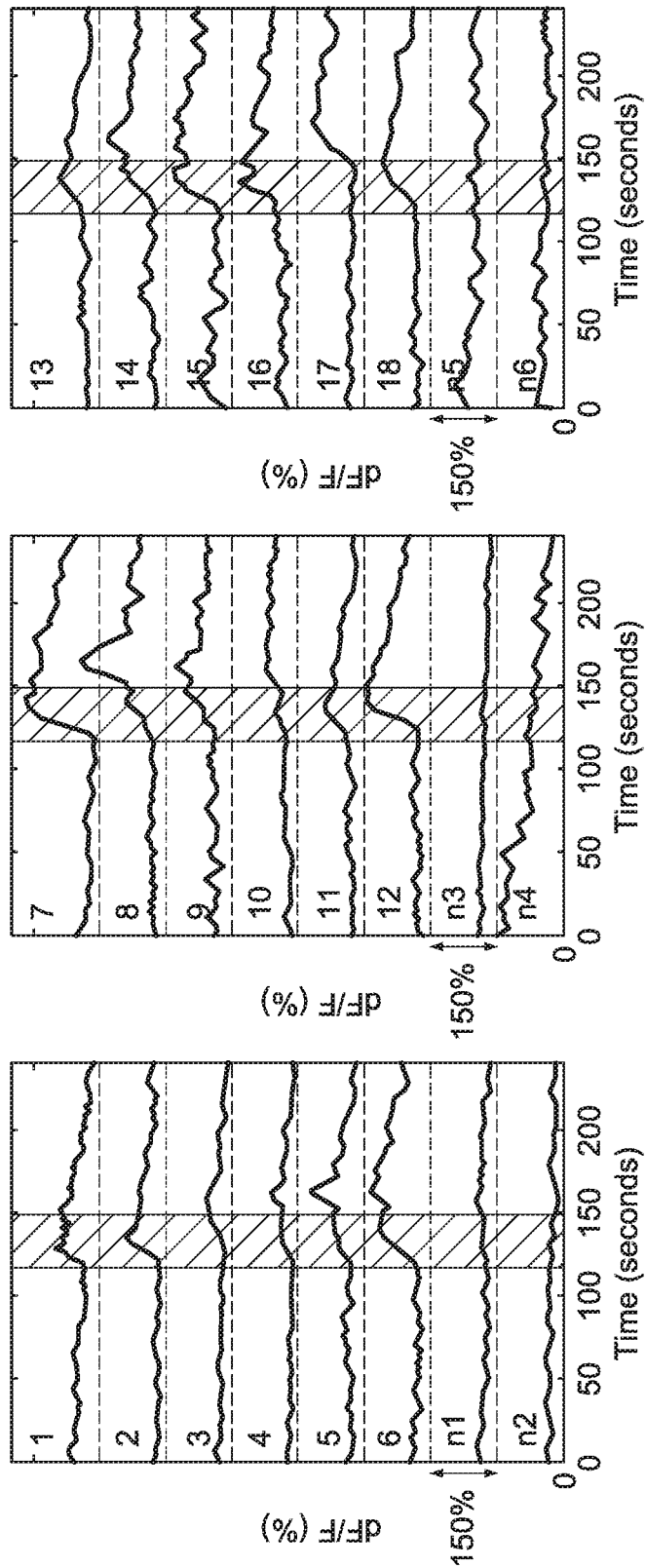

Eighteen (18) neurons (1-18) were selected that showed significant response to +10 mM NaCl stimulus and six (6) neurons (n1-n6) that did not were selected. Seven responsive neurons were in the head, and 11 responsive neurons were found along the ventral cord. Two unresponsive neurons were in the head and four unresponsive neurons were along the ventral cord. Those 24 neurons are annotated in FIG. 13(*a*). The responsive neurons were spread over the whole animal from the head to the tail. The fluorescent intensity levels of the responsive neurons stayed level with a little oscillation for the first 120 seconds. Then, the fluorescent intensity levels significantly increased during the 30 second of +10 mM NaCl stimulation. Most of the responsive neurons showed over 50% intensity level increase, and several of the responsive neurons (6, 7, 12, 15, 16, 18) showed intensity level increase more than 100%. Remarkably, some neurons' fluorescent intensity levels (4, 5, 6, 8, 9, 14, 17) rose right after the withdrawal of the +10 mM NaCl stimulation ended. The animal seemed to respond to the withdrawal of +10 mM NaCl stimulus and evoke neuronal responses to a different sets of neurons. The other responsive neurons showed gradual decrease in fluorescent intensity level over the final 90 seconds after the stimulus termination. While some neurons responded to +10 mM NaCl stimulus, other neurons (n1-n6) showed no noticeable response to the stimulus.

A Parallel Microfluidic Axotomy-Imaging Platform (or Worm Hospital)

Device Overview

Referring now to FIGS. 6(*a*)-6(*b*), a microfluidic device (also referred to herein as a "parallel microfluidic platform" or "parallel microfluidic device") for use trapping a plurality of specimens for surgery or imaging is shown. The parallel microfluidic platform is designed to rapidly orient and immobilize L4 stage worms for femtosecond laser axotomy, long-term on-chip housing, and post-surgery imaging of axotomized worms at developmental stage between L4 to young adult.

The parallel microfluidic platform can include an inlet 601 for receiving the specimens (e.g., *C. elegans* or worms or nematodes), an outlet 602*a*, 602*b* (collectively referred to herein as outlet 602) in fluid connection with the inlet 601, and a plurality of immobilization channels 603 extending between the inlet 601 and the outlet 602. Each of the immobilization channels 603 can include a plurality of sections (e.g., sections z1, z2, z3 in FIGS. 6(*a*)-6(*b*)), and each respective section has a different width and/or height as compared to the other sections. For example, the parallel microfluidic platform can include a set of 20 parallel immobilization channels 603 as shown in FIG. 6(*a*). It should be understood that the parallel microfluidic platform can include more or less than 20 immobilization channels. The parallel microfluidic device can include a perfusion compartment 604 arranged between the inlet 601 and the immobilization channels 603. The perfusion compartment 604 is for housing the nematodes after the surgery for long-term imaging. As shown in FIG. 6(*a*), the parallel microfluidic device can include: an inlet 601 for delivering the worms in and out of the microfluidic chip; a plurality of immobilization channels 603, each configured to orient and immobilize a single worm for axotomy and post-surgery imaging; an outlet 602 for guiding the worms along the immobilization channels 603; and a perfusion compartment 604 for housing and feeding the axotomized worms after the surgery.

To achieve a high degree of immobilization and also have the worms immobilized with a desired lateral orientation, each individual immobilization channel 603 is designed to have a tapered geometry to immobilize the worms for axotomy. In other words, a width of each of the immobilization channels 603 decreases in the direction extending between the inlet 601 and the outlet 602. For example, the respective widths of sections z1, z2, z3 of each of the immobilization channels is different. A tapered channel geometry enables partial immobilization because the vertical freedom of movement in the immobilization channels. The lateral orientation of the worms can be arbitrary, which can be unfavorable for axotomy and imaging. In order to obtain the high degree of immobilization and desired lateral orientation required for a successful axotomy, each tapered immobilization channel is designed to have a plurality of sections (e.g., three different sections z1, z2, z3 in FIGS. 6(*a*)-6(*b*)), each section having different channel heights and aspect ratio. In FIGS. 6(*a*)-6(*b*), each of the immobilization channels 603 has three different sections z1, z2, z3. It should be understood that each of the immobilization channels may have more or less than three sections. The goal of the triple-layer parallel immobilization device is to immobilize L4 stage *C. elegans* rapidly and to control the orientation of the nematode during the filling of the traps. The parallel microfluidic device can have a plurality of outlets 602*a* and 602*b*, each outlet in fluid connection with a subset of the immobilization channels 603.

FIG. 6(*a*) is a schematic top-view illustrating the parallel microfluidic chip. The immobilization channels 603 are used to immobilize the nematodes for laser axotomy and post-process imaging. Synchronized worms are loaded into the parallel microfluidic chip through the inlet 601. During the immobilization, a positive pressure gradient is created between the inlet 601 and the outlet 602. After the axotomy process is finalized, the worms can be pushed back into the perfusion compartment 604 for post-surgery feeding. During the post-surgery feeding, the worms are housed and fed inside the perfusion compartment 604. The feeding is achieved by creating a positive pressure gradient between a perfusion inlet 605 and a perfusion outlet 606 both in fluid connection with the perfusion compartment 604. In FIG. 6(*a*), section z3, z2, z1 of each of the immobilization channels have heights of 10 µm, 22 µm, and 40 µm, respectively.

Figure 6A:
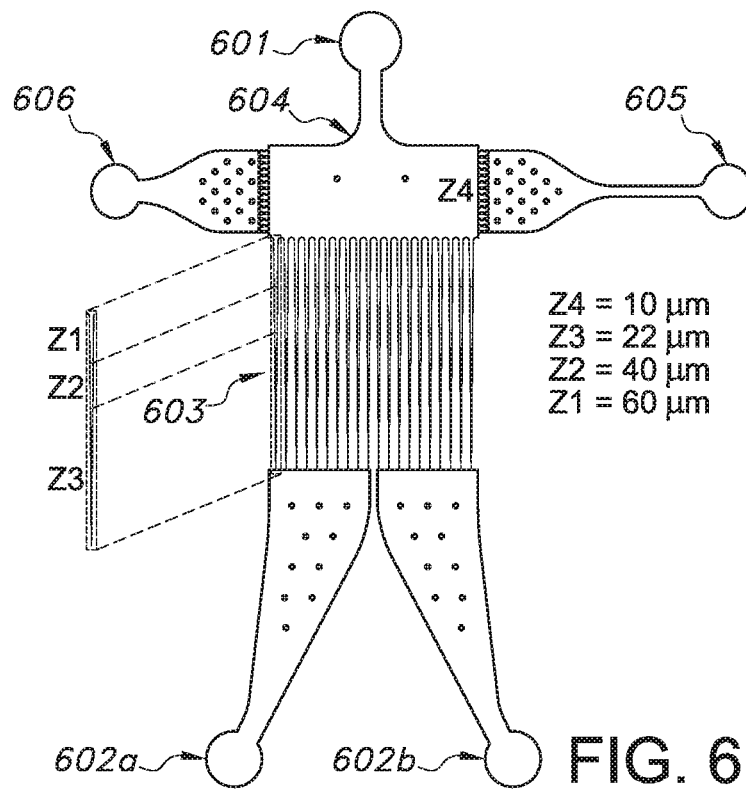
FIGS. 6(a)-6(b) illustrate a microfluidic device for use trapping a plurality of specimens for surgery or imaging.
Figure 6B:
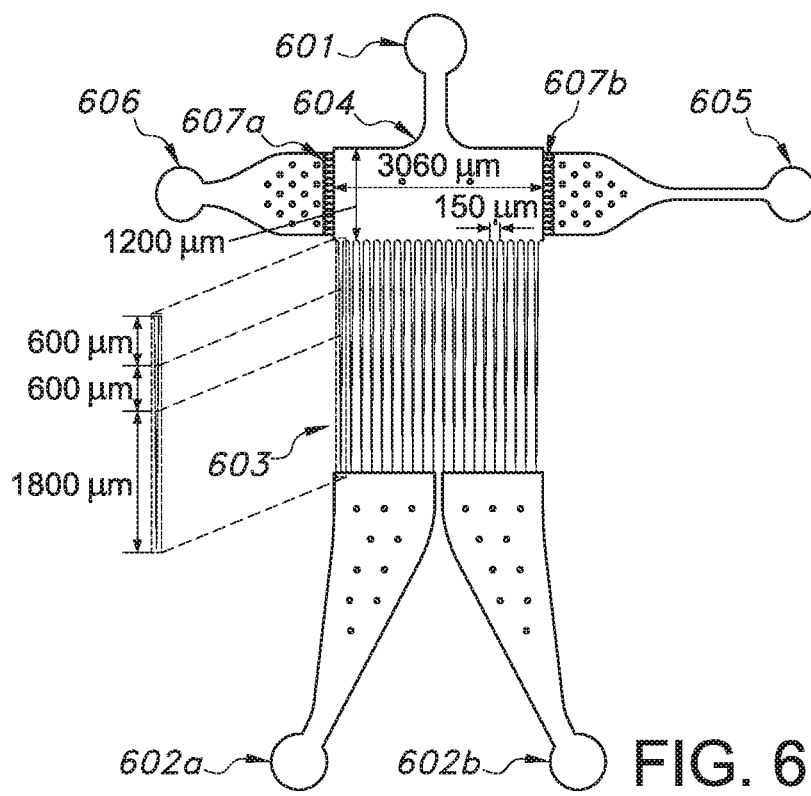
Figure 7A:
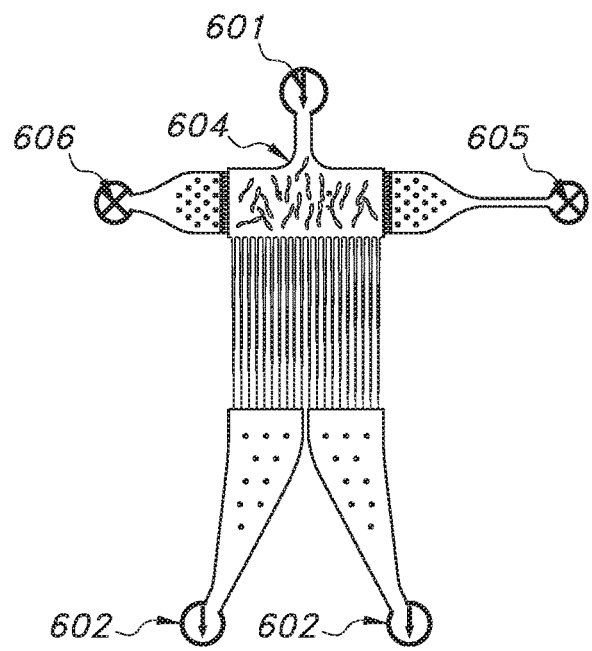
FIGS. 7(a)-7(g) illustrate an example valve sequence used with the parallel microfluidic device shown in FIGS. 6(a)-6(b).
Figure 7B:
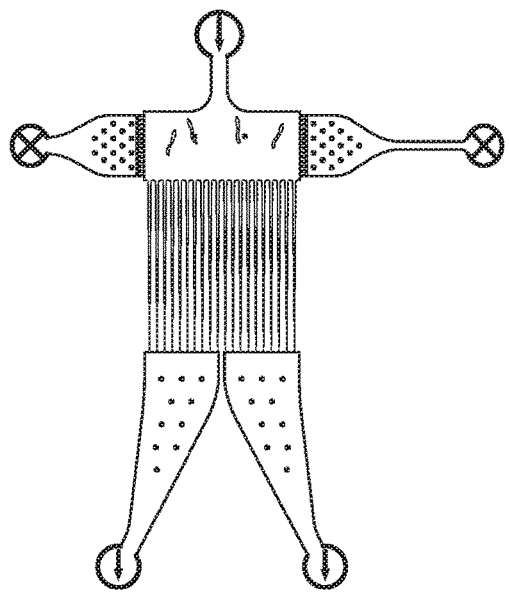
Figure 7C:
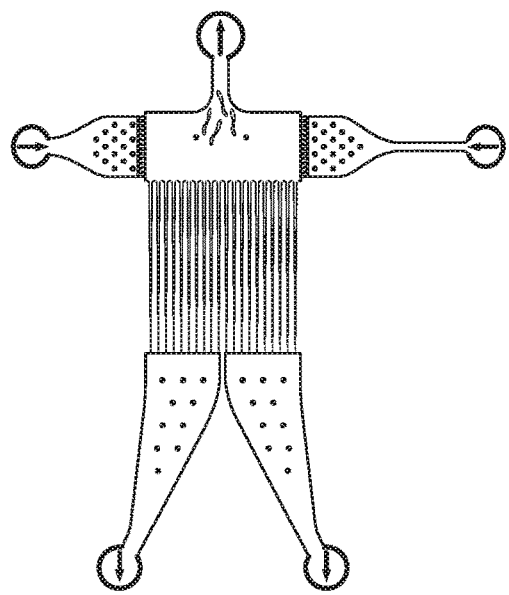
Figure 7D:
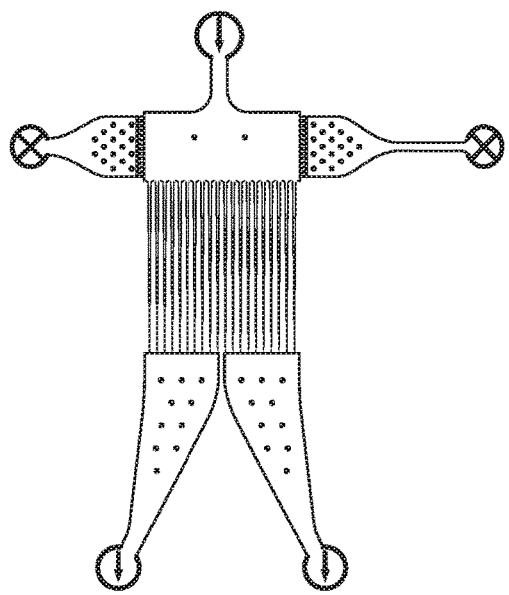
Figure 7E:
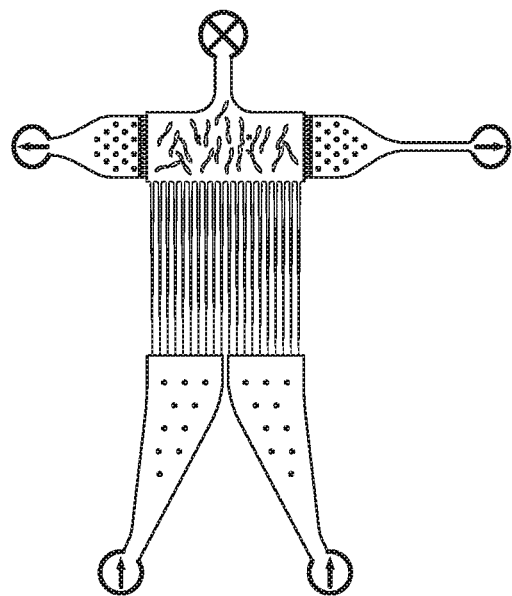
Figure 7F:
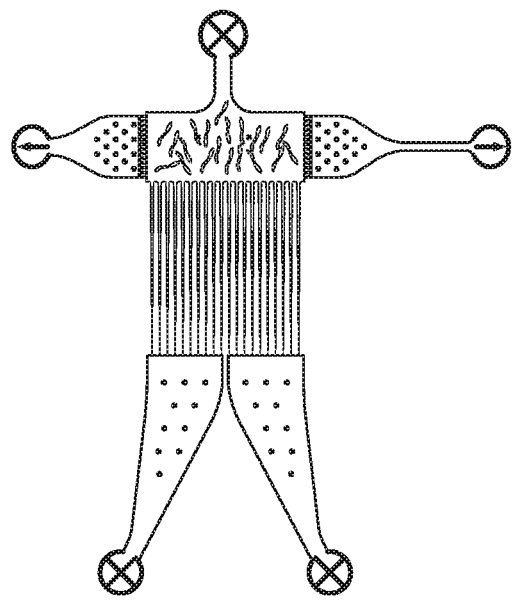
Figure 7G:
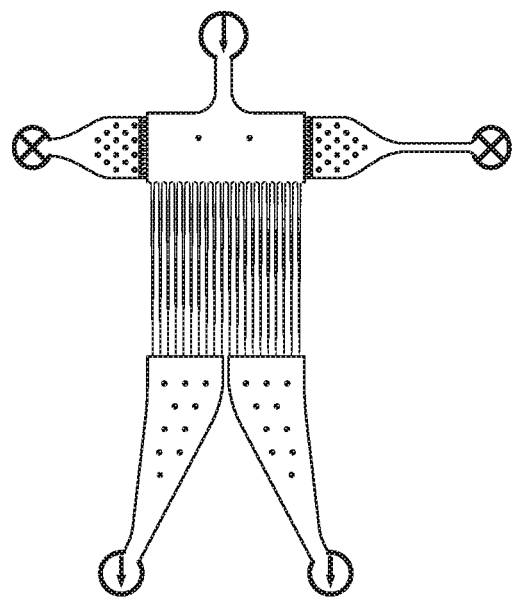

FIGS. 7(a)-7(g) illustrate an example valve sequence used with the parallel microfluidic device of FIGS. 6(a)-6(b). In FIG. 7(a), a population of worm is put into microfluidic chip through inlet 601. The outlet 602 is opened to create a pressure gradient between inlet 601 and outlet 602 so that the worms can be pushed inside each immobilization channel. The perfusion inlet 605 and perfusion outlet 606 are closed. As shown in FIG. 7(b), a plurality of worms are pushed inside individual trapping chambers. In FIG. 7(c), the remaining worms inside the perfusion compartment 604 are delivered out of the microfluidic chip by reversing the flow at the perfusion inlet 605 and perfusion outlet 606. As shown in FIG. 7(d), after remaining worms are pushed out of the microfluidic chip, the axotomy is performed on each immobilized worm. In FIG. 7(e), axotomized worms are pushed back to the perfusion compartment 604 by changing the flow at outlet 602 and opening the perfusion inlet 605 and perfusion outlet 606. In FIG. 7(f), axotomized worms are housed on chip and fed through the flow between perfusion inlet 605 and perfusion outlet 606. In FIG. 7(g), on-chip incubated worms are immobilized again with a similar procedure as described with reference to FIG. 7(d) for performing post-surgery imaging.

Microfluidic Device Compartments

Worm inlet (e.g., inlet 601 in FIGS. 6(a)-6(b)): The worm inlet constitutes the interface between inside and outside of the microfluidic chip. The inlet is pressurized to push the worms inside immobilization channels (FIGS. 7 a,b,d and g). Depending on the cycle of the process, the inlet might be closed (FIGS. 7 e and f), open-ended (FIG. 7 c), or pressurized (FIGS. 7 a,b,d and g).

Trapping chamber (e.g., each of the plurality of immobilization channels 603 in FIGS. 6(a)-6(b): Each trapping chamber has three different device section, e.g., zone 1 (Z1, 60 µm height & 600 µm length), zone 2 (Z2, 40 µm height & 600 µm length) and zone 3 (Z3, 22 µm height & 1800 µm length). The immobilization channels 603 are arranged substantially in parallel to each other. As described herein, parallel immobilization channels 603 can contribute to increasing the speed and efficiency of automated imaging techniques. Additionally, the immobilization channels can reduce net hydraulic resistance for the microfluidic device. The immobilization channels 603 can be arranged with approximately equal spacing between adjacent immobilization channels. For example, the spacing between each immobilization channel can be 150 µm. The change of width and height throughout each of the immobilization channels 603 allows for rapid orientation and immobilization of individual nematodes.

Exit outlet (e.g., outlet 602 in FIGS. 6(a)-6(b)): There can be a plurality of outlets included in the microfluidic device. In FIGS. 6(a)-6(b), each respective outlet 602a and 602b is in fluid connection with a first subset of the immobilization channels and a second outlet is in fluid connection with a second subset of the immobilization channels, respectively. In this way, each outlet 602a and 602b helps to manipulate 10 worms inside the immobilization channels 603. Thus, having two outlets provides immobilization of 10 worms at once when desired. It should be understood that the microfluidic device can have more or less than two outlets.

Perfusion compartment (e.g., the perfusion compartment 604 in FIGS. 6(a)-6(b)): The perfusion compartment can have a perfusion inlet 605 and perfusion outlet 606 in fluid connection therewith. The perfusion area is shown in FIG. 6(b) and has a width of 3060 µm, length of 1200 µm and a height of 60 µm. The height of perfusion inlet and outlet are 10 µm (e.g., z4 of FIGS. 6(a)-6(b)). A sieve structure 607a, 607b can be arranged in the boundary region between the perfusion compartment 604 and the perfusion inlet 605 and/or the perfusion outlet 606 as shown in FIG. 6(b). The sieve structure 607a, 607b can include long sieve-like structures. These sieve structures lead to a narrow channel that is 10 µm high and 8 µm wide. The rationale behind incorporating 10 µm height sieve structures is to block the entrance of the worms into the perfusion channels while allowing the fluid flow for feeding.

A high-throughput, automated, high-resolution 3D imaging platform is described above. The imaging platform includes: a high-speed laser scanning confocal microscope (e.g., the confocal laser scanning microscope of FIGS. 1(a)-1(b) and the parallel microfluidic axotomy-imaging platform (or worm hospital) (i.e., the microfluidic device of FIGS. 6(a)-6(b)). In this high-throughput automated confocal imaging, a 40× oil objective lens (Nikon, 40×, 1.3NA) is used. With the 40× objective, the confocal microscope provides maximum 350 µm×350 µm field-of-view (FOV), and the lateral resolution of 275±11 nm and the axial resolution of 1.16±0.14 nm. A microfluidic device is also used, which enables efficient automation of imaging. The microfluidic device has 20 worm trapping channels which are evenly separated from one another. The active trapping regions of the trapping channels are maximum 50 µm wide or narrower. Hence, the FOV can be set to be 350 µm×50 µm, and the pixel numbers to be 3500×500 to use the full capacity of the imaging resolution. With the 3500×500 pixel resolution, the confocal microscope demonstrates the imaging speed of 31 frames-per-second (FPS). The z-axis step size can be set to be 200 nm and the number of z-axis steps to be 150, thus, the overall imaging volume size is 350 µm (x)×50 µm (y)×30 µm (z).

Figure 8:
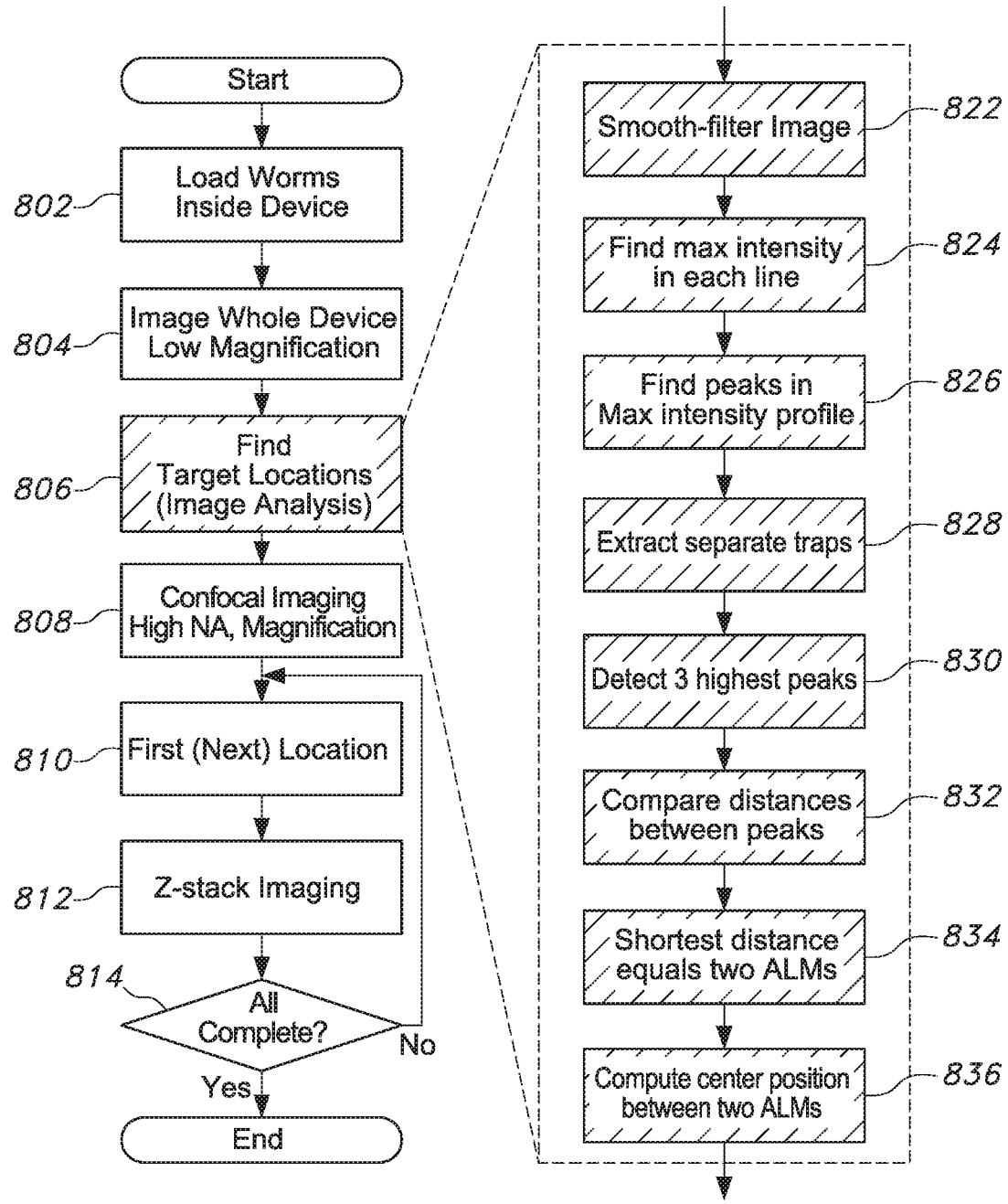
FIG. 8 is a flow chart illustrating a high-throughput automated imaging work flow.

Referring now to FIG. 8, a high-throughput automated imaging work flow is shown. A microfluidic device (e.g., the microfluidic device of FIGS. 6(a)-6(b)) is loaded on a translational device of a laser scanning system (e.g., the confocal laser scanning system of FIGS. 1(a)-1(b)). The orientation of the microfluidic device is aligned to minimize the tilting of the trapping channels (e.g., the immobilization channels 603 of FIGS. 6(a)-6(b)) in the field-of-view. At 802, the worms are loaded inside the trapping channels of the microfluidic device, and a fluorescence image of the worms trapped within the microfluidic device is acquired through a low magnification objective lens (e.g., the objective lens 113 of FIG. 1(a)) using a sensor camera (e.g., the sensor camera 121 of FIG. 1(a)) at 804. In step 804, the objective lens can have a relatively low-magnification such as 4×, for example. It should be understood that the magnification can be more or less than 4×. For example, the magnification of the high-magnification volumetric image (described below) can be at least 5 times greater than the magnification of the low-magnification image. The low-magnification image can be transmitted to custom software for performing imaging target location analysis (step 806 in FIG. 8).

A computer-implemented method for performing imaging target location analysis is now described. One of ordinary skill in the art would understand that the method described below can be performed by a computing device (e.g., the computing device 1100 of FIG. 11). At 822, a smooth filter is optionally applied to the low-magnification image. The smooth filter can optionally be a moving average filter. In one implementation, a moving average filter can use a vector of ones with a length of 5 (i.e., a small vector) then convolves an input vector data with this small vector. The resultant vector is a moving average of the input vector.

Herein, the input vector can be the maximum pixel intensities along each column of the segmented image. It should be understood that this is provided as only one example of the moving average filter.

An intensity profile of the low-magnification can be created. The intensity profile can include the highest intensity pixel (e.g., the peak intensity pixel value) in each line (e.g., each row of the image) from the top to the bottom of the fluorescence image. For example, at 824, the highest intensity pixel in each line from the top to the bottom of the fluorescence image is identified. Then, at 826, the peak intensity pixel values that correspond to the trapped worms and trapping channels are identified. This can be performed by disregarding one or more of the peak intensity pixel values in the intensity profile having a value less than a threshold value. The threshold value represents unhealthy worm that are not worth imaging. The threshold value can optionally be 30% of the average peak intensity pixel value. It should be understood that the threshold value can be more or less than 30% of the average peak intensity value so long as it translates to the intensity pixel value of a worm not worth imaging. At 828, using the intensity profile, the low-magnification image can be segmented into a plurality of segments, wherein each of the segments includes a respective worm. After segmenting, the image can be analyzed to identify anterior lateral microtubule ("ALM") cells of the worms.

Then, for each segment, a feature of interest (e.g., an ALM cell) of the worm, as well as a center location of the feature of interest can be identified. At 830, a plurality of highest intensity pixel values within the segment are identified. For example, the three highest intensity pixel values in the segment are identified. The three highest intensity pixel values correspond to two ALM cells and two posterior lateral microtubule ("PLM") cells. The two PLM cells however appear to be one of the highest intensity pixel values because they are very close to each other. At 832, respective distances between pairs of the three highest intensity pixel values are calculated, and the calculated distances are compared. Using this information, at 834, it is possible to identify the two ALM cells because the smallest calculated distance between pairs is the distance between the two ALM cells. At 836, for each ALM cell (e.g., each feature of interest), the center location is determined. Steps 828-834 is repeated for all the segmented trap images (e.g., for each segment). Then, a translational moving sequence for high-magnification imaging can be generated from the center locations of the features of interest (e.g., the ALM cells). In particular, translational moving distances from one ALM cell location to the next ALM cell location can be used to drive the translation device of the confocal laser scanning microscope.

After generating the translational moving sequence, the automated confocal imaging session can begin at 808. The low-magnification objective lens (e.g., 4×) of the confocal laser scanning microscope can be replaced by a high-magnification objective lens (e.g., a 40× objective lens), then, run the automated confocal imaging software is run. As discussed above, the magnification of the high-magnification lens can be at least 5 times greater than the magnification of the low-magnification lens. At 810-814, the automated confocal imaging software is used to drive the translational device of the confocal laser scanning microscope to the ALM cell locations, for example, by following the translational moving sequence generated as described above, as well as take z-stack images of the ALM axons. The automated confocal imaging software completes the automated imaging session after the automated confocal imaging software images the last ALM axon.

The automated confocal imaging session described above takes 10 minutes in total. Imaging one z-stack of an ALM axon takes 29 seconds. 6 frames are taken for each plane for averaging, and the translational device movement for each step takes 2 ms, hence, 29 seconds are required for imaging one ALM axon (150 planes×6 frames/31 fps+150 planes×1 ms=29 seconds). Moving from one ALM location to the next ALM location takes 1 second. Thus, overall, the whole automated confocal imaging session for 20 worms takes 10 minutes (29 seconds/worm×20 worms+20 moves×1 second/move=600 seconds=10 minutes).

Results:

The imaging speed of the high-throughput automated confocal imaging platform described above can be compared to the estimated imaging speed of state-of-the-art commercial confocal microscopes. The latest scanning confocal microscope of ZEISS of Oberkochen, Germany (i.e., LSM780) demonstrates the imaging speed of 8 FPS with 512×512 pixels referring to its specification. The imaging speed of LSM780 for 3500×500 pixels is estimated to be 1.4 FPS. Therefore, to complete one automated imaging session, LSM780 needs 214 minutes which is more than 20 times the time required to perform the same imaging with the confocal laser scanning platform described herein. LSM780 still takes 72 minutes even if it takes only two frames per plane assuming LSM780 requires less averaging to acquire images of the same quality as the confocal laser scanning platform described herein due to LSM780's longer pixel duration.

Figure 9:
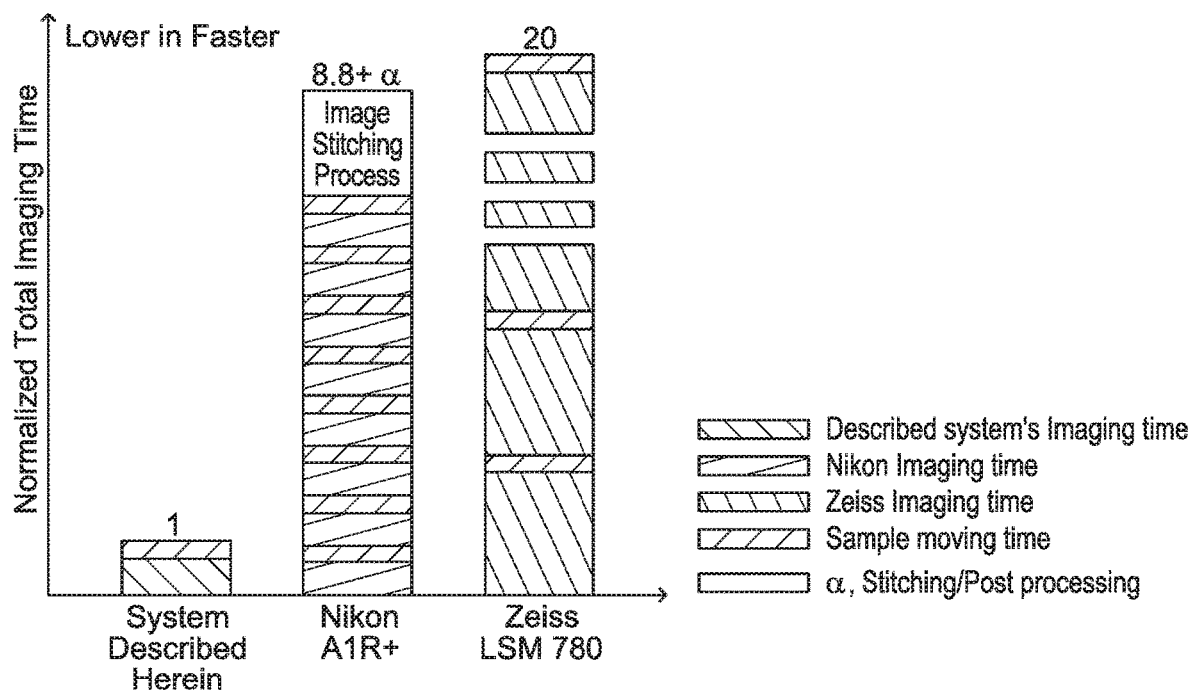
FIG. 9 is a chart comparing the imaging speed of the confocal laser scanning imaging platform described herein to state-of-the-art commercial laser scanning confocal microscopes (Nikon A1R+ and Zeiss LSM780).

The latest resonant scanning confocal microscope from NIKON CORP. of Tokyo, Japan (i.e., A1R+) demonstrates the imaging speed of 30 FPS with 512×512 pixels. Unlike Zeiss' LSM780 and the confocal laser scanning platform described herein, A1R+ cannot provide pixels more than 512×512 pixels. Hence, A1R+ must take seven 512×512 images to acquire one 3500×500 image. Taking seven smaller images requires 6 times of sample moving to image the whole target area, and the sample moving prolongs the necessary time to image the whole target area. Assuming the sample moving takes 10 ms per move, A1R+ takes 291 ms to take one frame of 3500×500 image (3.43 FPS). Based on the imaging speed of 3.43 FPS, A1R+ needs 88 minutes to complete one automated imaging session. In addition, the 512×512 images taken by A1R+ have to be computationally stitched together to form a 3500×500 image. That image stitching process further increases the overall imaging time of A1R+. Based on the estimations above, the confocal laser scanning platform described herein is eight times as fast as A1R+ and 20 times as fast as LSM780. This is shown in FIG. 9.

Figure 10A:
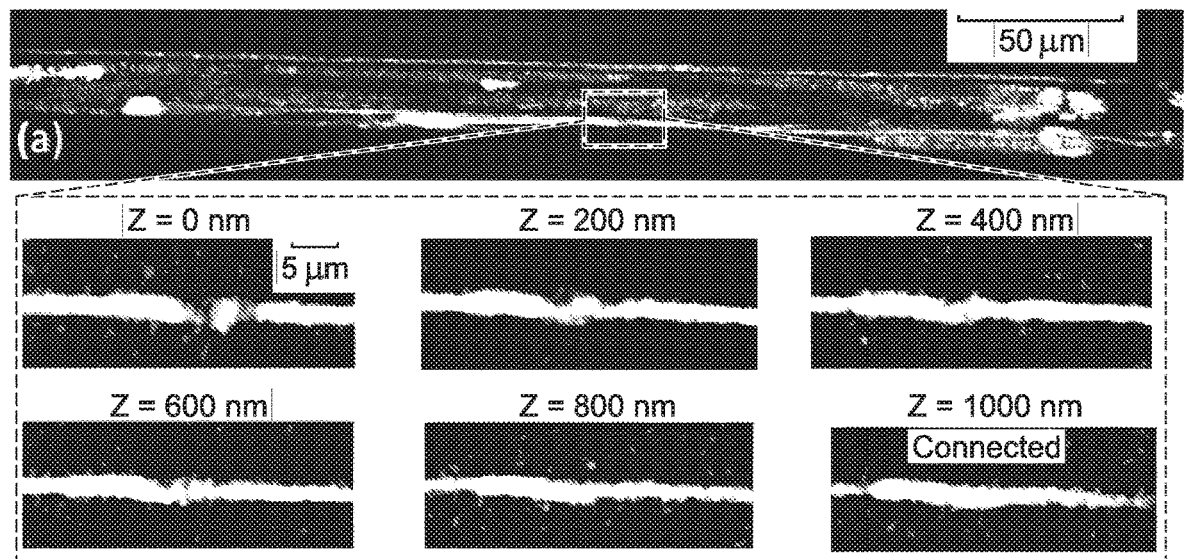
FIGS. 10(a)-10(b) are two sample images of the ALM axons.

FIGS. 10(*a*)-10(*b*) are two sample images of the ALM axons. FIG. 10(*a*) shows a reconnected axon, and FIG. 10(*b*) shows non-reconnected axon. The two wide images are the maximum projection of two z-stack images, and have the 350 μm×50 μm FOV. The ALM axons are aligned perfectly straight owing to the straight trapping channels. The unique design of the trapping channels also aligns the *C. elegans* orientation for the ALM axons to locate close to the walls of the trapping channel. The small rectangles depict the ALM axon surgery sites, and the magnified images of the surgery sites at different depths are shown in the large rectangles. Looking at the depth-resolved images in FIG. 10(*a*), the ALM axon seems disconnected at depth z=0 nm. However, the depth-resolved images at depth z=800 nm and 1000 nm, the ALM axon shows profound reconnection. The reconnection is successful that the ALM axon does not regrow extensively.

Figure 10B:
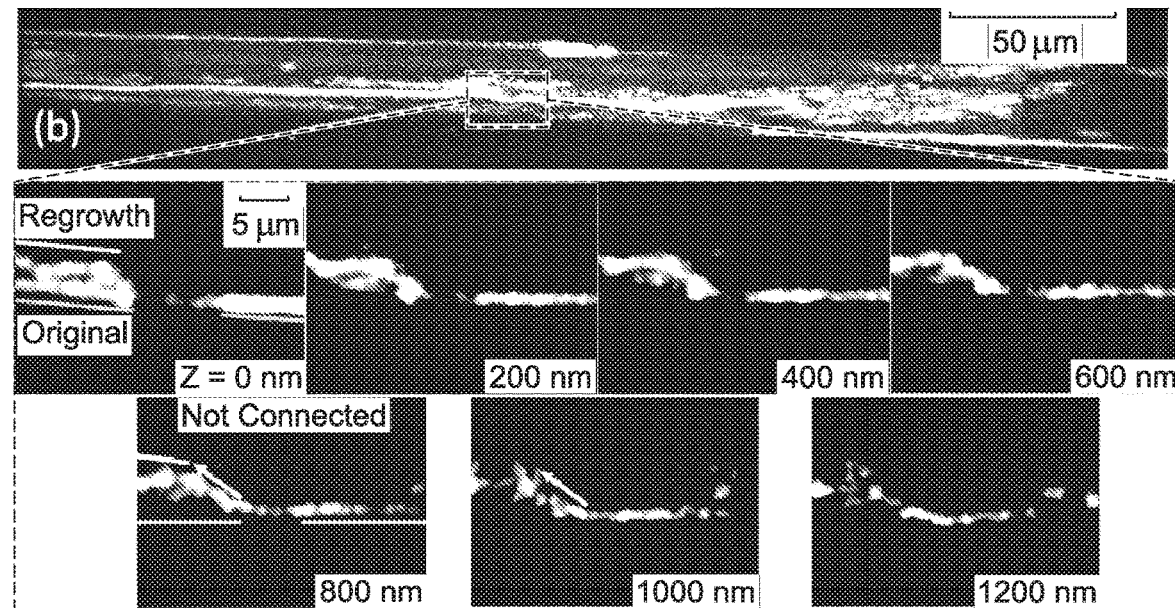

The non-reconnected ALM axon is shown in FIG. 10(b). The maximum projection image in FIG. 10(b) shows much more autofluorescence than the maximum projection image in FIG. 10(a) does. The autofluorescence is also significant around the axotomy site in the small rectangle. However, the autofluorescence disappears in the depth-resolved zoom-in images in the large rectangle due to the out-of-focus signal rejection by confocal imaging. The out-of-focus signal rejection enables accurate observation of the regrown ALM axon. The ALM axon regrowth seems insignificant at depth between z=0 nm and z=600 nm. The image at depth z=800 nm shows the ALM axon regrew upwards disregarding the opposite distal end of the wounded axon. Thus, the reconnection of the ALM axon is not achieved as shown in the images at depth between z=800 nm and z=1200 nm. The failure in axon reconnection resulted in the excessive regrowth of ALM axon shown in the maximum projection image, which is the result of the ALM axon's struggle to make a reconnection.

It should be appreciated that the logical operations described herein with respect to the various figures (e.g., the operations of the imaging parameter control unit 110, the multifunction DAQ 112, the synchronization control unit 160 of FIG. 1B and/or the imaging workflow of FIG. 8) may be implemented (1) as a sequence of computer implemented acts or program modules (i.e., software) running on a computing device, (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 11:
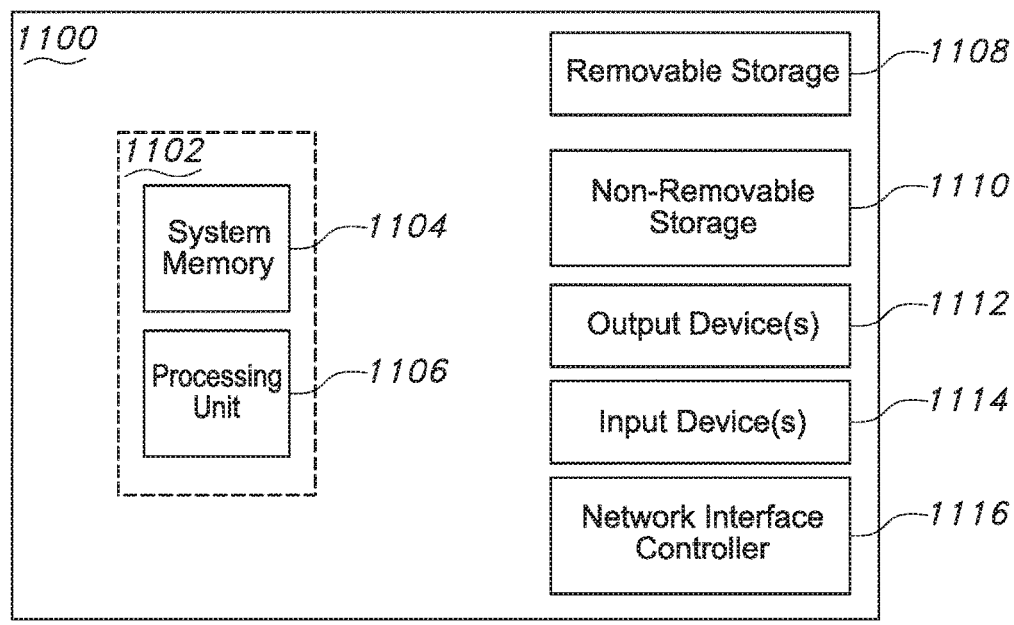
FIG. 11 is a block diagram of an example computing device.

When the logical operations described herein are implemented in software, the process may execute on any type of computing architecture or platform. For example, referring to FIG. 11, an example computing device upon which embodiments of the invention may be implemented is illustrated. The computing device 1100 may include a bus or other communication mechanism for communicating information among various components of the computing device 1100. In its most basic configuration, computing device 1100 typically includes at least one processing unit 1106 and system memory 1104. Depending on the exact configuration and type of computing device, system memory 1104 may be volatile (such as random access memory (RAM)), non-volatile (such as read-only memory (ROM), flash memory, etc.), or some combination of the two. This most basic configuration is illustrated in FIG. 11 by dashed line 1102. The processing unit 1106 may be a standard programmable processor that performs arithmetic and logic operations necessary for operation of the computing device 1100.

Computing device 1100 may have additional features/functionality. For example, computing device 1100 may include additional storage such as removable storage 1108 and non-removable storage 1110 including, but not limited to, magnetic or optical disks or tapes. Computing device 1100 may also contain network connection(s) 1116 that allow the device to communicate with other devices. Computing device 1100 may also have input device(s) 1114 such as a keyboard, mouse, touch screen, etc. Output device(s) 1112 such as a display, speakers, printer, etc. may also be included. The additional devices may be connected to the bus in order to facilitate communication of data among the components of the computing device 1100. All these devices are well known in the art and need not be discussed at length here.

The processing unit 1106 may be configured to execute program code encoded in tangible, computer-readable media. Computer-readable media refers to any media that is capable of providing data that causes the computing device 1100 (i.e., a machine) to operate in a particular fashion. Various computer-readable media may be utilized to provide instructions to the processing unit 1106 for execution. Common forms of computer-readable media include, for example, magnetic media, optical media, physical media, memory chips or cartridges, a carrier wave, or any other medium from which a computer can read. Example computer-readable media may include, but is not limited to, volatile media, non-volatile media and transmission media. Volatile and non-volatile media may be implemented in any method or technology for storage of information such as computer readable instructions, data structures, program modules or other data and common forms are discussed in detail below. Transmission media may include coaxial cables, copper wires and/or fiber optic cables, as well as acoustic or light waves, such as those generated during radio-wave and infra-red data communication. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 1106 may execute program code stored in the system memory 1104. For example, the bus may carry data to the system memory 1104, from which the processing unit 1106 receives and executes instructions. The data received by the system memory 1104 may optionally be stored on the removable storage 1108 or the non-removable storage 1110 before or after execution by the processing unit 1106.

Computing device 1100 typically includes a variety of computer-readable media. Computer-readable media can be any available media that can be accessed by device 1100 and includes both volatile and non-volatile media, removable and non-removable media. Computer storage media include volatile and non-volatile, and removable and non-removable media implemented in any method or technology for storage of information such as computer readable instructions, data structures, program modules or other data. System memory 1104, removable storage 1108, and non-removable storage 1110 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1100. Any such computer storage media may be part of computing device 1100.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Advantages

In addition to providing flexible control of imaging parameters, the synchronization techniques described herein allow the user to use an ultrahigh speed DAQ card, which provides a higher sampling rate (e.g., 180 million samples per second (MS/s)) than any other existing laser scanning microscopes (e.g., 80 MS/s is the maximum speed of the currently available frame grabbers). Taking advantage of such a high speed DAQ card became possible with the development of the described synchronization technique. The existing techniques cannot achieve these advanced features simply by installing this high-speed DAQ. Combined with flexible control capability, the high-speed DAQ card's higher sampling rate enables the larger field-of-view and the larger number of pixels of provided by the confocal laser scanning microscope described herein.

Optionally, the synchronization techniques described herein can enable a two-photon microscope to take images of up to 7000×500 pixels at 30 Hz rate, for example. This is a faster rate than two-photon microscopes known to date. In two-photon microscopy, at least two ultrafast laser pulses excite the sample fluorophores to generate one image pixel. Currently, the highest pulse repetition rate that ultrafast lasers achieve is about 80 MHz. Additionally, this disclosure contemplates using beam splitters to multiply the pulse repetition rate of an ultrafast laser, e.g., to multiply the pulse repetition rate by 8×, 16×, 64×, etc. to achieve higher imaging speeds. The use of beam splitters to multiply the pulse repetition rate of ultrafast lasers is known in the art. For example, this technique is described in Ji, Na et al., "High-speed, low-photodamage nonlinear imaging using passive pulse splitters," Nature Publishing Group vol. 5 (2) p. 197-202 (2008). In other words, using the synchronization techniques described herein, a two-photon microscope can use conventional ultrafast laser systems with 80 MHz pulse repetition rates or even higher pulse repetition rates.

The microfluidic device described herein immobilizes the small model animal, *C. elegans*, in a fashion that will enable high-throughput, high-resolution, and automated imaging as well as volumetric functional imaging of their nervous system faster than any existing method. The microfluidic device aids in automated imaging of large number of animals very rapidly. It straightens specimens to optimally fit the field-of-view of the laser scanning microscope. It also arranges the animals in parallel while keeping the distance between them consistent and minimal for fast imaging. This orderly arrangement also simplifies the automation process and prevents undesirable automation errors due to complexity.

The microfluidic device provides a different immobilization method as compared to current immobilization methods for high-resolution of *C. elegans*, which involve time-consuming manual methods. For example, using anesthetics, the animals are immobilized either on agar pads or inside well-plates. In either case, the immobilized animals are randomly oriented, usually bent, positioned in random distances, and many times clustered on top of each other. These features require finding each animal and focusing on their features of interest for high-resolution imaging that result in longer imaging and handling times. The randomly oriented, bent animals require a larger field-of-view than organized, straight animals, and a larger field-of-view leads again to a longer imaging time. Moreover, a huge portion of the larger field-of-view is wasted since it contains no information of the animals.

An automating imaging technique for high-throughput automated data acquisition of *C. elegans* nervous system are also provided. The technique includes locating target animals and their features of interest using a low resolution optical image and then moving to the identified locations of features of interest of each animal to take high resolution 3D images. First, the techniques includes taking an image of the whole microfluidic device with animals trapped inside the device. Then, it includes analyzing the image, computing the locations of the trapped animals and their feature of interest, and recording the coordinates of the features. Lastly, the technique includes moving to each animal's location, taking high-resolution 3D images of their features of interest, and repeating the process until completing the last animal. Such high-speed, high-resolution, 3D volumetric confocal imaging system does not currently exist.

Solves the Problem of Photo-Bleaching of Fluorescent Specimens

Photo-bleaching is the photochemical destruction of fluorescent protein molecules. The longer the fluorescent protein is exposed to the excitation light, the more photo-bleaching occurs, the less the specimen emits fluorescent light. The faster imaging speed of the confocal laser scanning microscope described herein provides imaging a specimen in a shorter time before the specimen experience severe photo-bleaching.

Solves the Problem of Limited Field-of-View

In conventional microscope, imaging of specimens with high aspect ratio requires acquiring multiple images to cover the whole length of the specimen. This process results in longer imaging times and sophisticated post-image processing algorithms to stitch the images correctly. These drawbacks make it impossible to image, for example, the whole nervous system of *C. elegans* with a high temporal resolution (1~2 volumes per second) to study the reaction of the nervous system to a stimulus. Therefore, the conventional 3D imaging techniques cannot provide the imaging speed fast enough to resolve the timely response of the signal propagation over the whole nerve system. The large field-of-view of the confocal laser scanning microscope described herein and the flexible pixel numbers enable imaging the whole nervous system of C. elegans at the speed fast enough to capture this timely response of the signal propagation over the whole nerve system.

Solves the Problem of Image Quality Degradation Due to Increased Stress on Biological Specimens Autofluorescence is a natural fluorescent light emission from biological cells and tissues. When the specimen is healthy, its autofluorescence is usually low enough not to interfere with the fluorescent light, therefore the signal-to-noise ratio (SNR) of fluorescence images is high enough for quality imaging. However, when the specimen is under stress, for example when C. elegans are immobilized under physical pressure, they begin expressing stronger autofluorescence over time. In addition, the fluorescent signal levels start degrading under stress that further reduce the SNR. The longer C. elegans are immobilized the weaker the SNR becomes. If the level of autofluorescence becomes comparable to the intensity of the fluorescence light from neuronal axons, the SNR significantly deteriorates and it can be very challenging to recognize the neuronal axons in the low SNR images. The confocal laser scanning microscope described herein addresses this image quality degradation due to SNR deterioration by completing the C. elegans imaging before the autofluorescence signifies or the health of their neurons deteriorate.

Solves the Problem of Excessive Time Consumption in Data Collection for Large Scale, High-Throughput Studies Large scale drug and genetic screens demand a collection of a large amount of images to establish statistically reliable conclusions. The integration of microfluidics immobilization with the confocal laser scanning microscope described herein enables high-throughput automated imaging, and thus, shortens the amount of time for data collection for large-scale studies.

Solves the Problems in Imaging Automation

Automation of imaging of small model animals needs to address a few challenges. For example, C. elegans naturally bend their bodies when they freely move around and even when they are anesthetized. Hence, their bodies have to be straightened when imaged. Another challenge is the arrangement of C. elegans. When the orientation of C. elegans vary, detection of the imaging location can be complicated and require a larger field of view to capture the whole nervous system. The microfluidic device described herein solves all the aforementioned problems by immobilizing and straightening C. elegans in parallel trapping channels. The dimensions of the trapping channels are designed to guide C. elegans to align themselves in ideal orientations for imaging.

Solves the Problem of Expensive Components

The confocal laser scanning microscope described herein uses more economic components than other high-speed imaging techniques. The most expensive component of the system is the high-speed DAQ card, which costs about $10,000. Some of the current high-speed imaging techniques use intensified CCD cameras to achieve high imaging speed. This intensified CCD camera is very costly, usually from $40,000 to $60,000 per unit. One of the high-speed imaging techniques using a hi-speed camera is two-photon temporal focusing microscopy (TF microscopy). TF microscopy also uses the high-speed camera and expensive lasers. However, the imaging speed of TF microscopy is not faster than that of the confocal laser scanning microscope described herein while the field-of-view of TF microscopy is significantly smaller, one-eighth, than that of the confocal laser scanning microscope described herein when using the same objective.

Solves the Problems of Expensive Data Storage and Analysis

The confocal laser scanning microscope described herein allow for flexible selection of pixel numbers and field-of-view control, which save data storage space and reduce data analysis time. The flexibility of choosing the desired FOV and number of pixels enables the user to exactly fit the imaging field-of-view to the size of the animal. Hence, the image of the animal has no wasted data. However, other imaging methods with limited control of field-of-view and pixel numbers cannot fit the imaging field-of-view to the size of the animal. Thus, the image of animal is bound to have wasted data with no information of the animal's features while the wasted data makes the image size larger than necessary. The larger the image size is, the more the data storage space is required, the longer the analysis of the image takes. In contrast, the confocal laser scanning microscope described herein prevents waste of data, thus, requires less data storage space and reduces image analysis time.

Faster Imaging Speed and Oversampling

Because the synchronization controller described herein can take advantage of an ultra-high speed DAQ card, it can improve the speed of any other optical imaging modality, including laser scanning microscopes, nonlinear imaging with or without temporal focusing, OCT, etc. while enabling oversampling of each pixel to improve SNR.

Compared to Non-Resonant Scanning Confocal Microscopes:

For example, the confocal laser scanning microscope described herein demonstrates much faster imaging speed than the any commercial non-resonant confocal microscopes. Our microscope requires 33 ms to take an image of 512×512 pixels. A state-of-the-art non-resonant scanning confocal microscope from Olympus requires 125 ms to acquire the same image, which is nearly four times as long.

In addition, the confocal laser scanning microscope described herein can oversample, namely make a larger number of samples for pixel, while spending the same amount of time per pixel. On the contrary, non-resonant confocal microscopes need a longer time to take an image as the number of pixels in an image increases. For example, the confocal laser scanning microscope described herein requires 33 ms to take an image of 7,000×512 pixels, while the Olympus non-resonant confocal microscope needs 1,712 ms to take the same image, which is nearly 52 times longer.

Larger FOV

Compared to Scanning Confocal Microscopes:

The confocal laser scanning microscope described herein offers a much larger FOV than other commercial resonant scanning confocal microscopes. For example, the confocal laser scanning microscope described herein can image up to 350 μm with a 40×, 1.3NA objective, and up to 650 μm with 20×, 0.95NA objective. However, a state-of-the-art resonant scanning confocal microscope from Nikon can image up to 50 μm both vertically and horizontally with the same 40× objective lens.

Compared to Spinning Disk Confocal Microscopes:

The confocal laser scanning microscope described herein offers a much larger field-of-view than commercial spinning disk confocal microscopes. Most commercial spinning disk confocal microscopes provide up to 100 μm by 100 μm field-of-view with a 40× objective lens. They are limited by the camera sensor size and the pixel number to maintain the imaging speed. The confocal laser scanning microscope described herein provides a FOV larger than any other spinning disk confocal microscopes.

Larger Number of Pixels

Compared to Resonant Scanning Confocal Microscopes:

The confocal laser scanning microscope described herein generates a higher number of pixels per image. The confocal laser scanning microscope described herein can generate an image with maximum 7000×4000 pixels (28 mega pixels) while the state-of-the-art resonant scanning confocal microscope from Nikon can generate an image with maximum 512×512 pixels (0.25 mega pixels).

Compared to Spinning Disk Confocal Microscopes:

The confocal laser scanning microscope described herein provides a high number of pixels per image and a larger field-of-view. The confocal laser scanning microscope described herein can generate an image with maximum 7,000×4,000 pixels (28 mega pixels) while spinning disk confocal microscopes usually takes images with 1,024×1,024 pixels restricted by the camera performance. A camera with a larger number of pixels will not provide any benefit to spinning disk microscopes due to the low resolution of spinning disk and the cross-talk between pixels. A larger pixel number will also slow down the imaging speed of spinning disk confocal microscopes.

Compared to Non-Resonant Scanning Confocal Microscopes:

The confocal laser scanning microscope described herein generates a comparable number of pixels per image but the confocal laser scanning microscope described herein provides a much greater imaging speed.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A laser scanning system for capturing an image of a specimen, comprising:
    a light source configured to emit a light beam for illuminating the specimen;
    a scanning unit comprising a plurality of reflectors, wherein a first reflector scans the light beam along a first axis and a second reflector scans the light beam along a second axis, wherein the first reflector is a resonant mirror and the second reflector is a non-resonant mirror;
    a data acquisition unit configured to control acquisition of the image of the specimen;
    a control circuit configured to receive a reference clock signal and generate a synchronization clock signal based on the reference clock signal, wherein, the reference clock signal is configured to drive the first reflector, and wherein the synchronization clock signal marks a timing to synchronize operations of the first reflector and the second reflector; and
    a synchronization controller configured to control the scanning unit and the data acquisition unit, the synchronization controller comprising a processor and memory operably coupled to the processor, the memory having computer-executable instructions stored thereon that, upon execution by the processor, cause the synchronization controller to:
        receive a user input signal including a plurality of imaging parameters, wherein the imaging parameters comprise a variable number of lines in the image;
        receive the synchronization clock signal from the control circuit;
        generate a plurality of control signals comprising a first control signal and a second control signal based on the synchronization clock signal and the imaging parameters;
        transmit the first control signal to the scanning unit, wherein the first control signal is configured to synchronize operation of the first and second reflectors, and
        wherein the data acquisition unit is configured to initiate acquisition of a new frame of the image of the specimen based on the second control signal, and wherein a respective period of each of the first and second control signals is variable based on the variable number of lines in the image.

2. The laser scanning system of claim 1, wherein the imaging parameters further comprise at least one of a number of pixels per line in the image or a field of view.

3. The laser scanning system of claim 2, wherein the field of view comprises a horizontal scan range and a vertical scan range.

4. The laser scanning system of claim 2, wherein an amplitude of the first control signal is variable based on the field of view.

5. The laser scanning system of claim 4, wherein a level of the first control signal increases incrementally after each cycle of the synchronization clock signal to the amplitude before returning to a minimum level.

6. The laser scanning system of claim 2, wherein the memory has further computer-executable instructions stored thereon that, upon execution by the processor, cause the synchronization controller to generate a fourth control signal for controlling operation for the first reflector, and wherein an amplitude of the fourth control signal is variable based on the field of view.

7. The laser scanning system of claim 1, wherein each respective period of the first and second control signals is equal to a period of the synchronization clock signal times the variable number of lines in the image plus 1.

8. The laser scanning system of claim 1, wherein each respective period of the first and second control signals is approximately equal.

9. The laser scanning system of claim 1, wherein the laser scanning system is at least one of a confocal laser scanning microscope, a multi-photon laser scanning microscope, or an optical coherence tomography.

10. The laser scanning system of claim 1, wherein the control circuit is further configured to:
    generate an enhanced reference clock signal from the reference clock signal; and
    generate the synchronization clock signal from the enhanced reference clock signal.

11. The laser scanning system of claim 10, wherein generating the enhanced reference clock signal comprises at least one of filtering, regulating a voltage of, suppressing fluctuation of, or supplying current to the reference clock signal.

12. The laser scanning system of claim 1, wherein the control circuit comprises a frequency doubler circuit for generating the synchronization clock signal.

13. The laser scanning system of claim 1, further comprising a translational device for supporting the specimen, the translational device being configured to move along a third axis, wherein the plurality of control signals include a third control signal for synchronizing operation of the scanning unit, the data acquisition unit, and the translational device.

14. The laser scanning system of claim 13, wherein the imaging parameters comprise at least one of a translational device movement range or a number of translational device movement steps.

15. The laser scanning system of claim 14, wherein a period of the third control signal is variable based on the number of translational device movement steps.

16. The laser scanning system of claim 15, wherein the period of the third control signal is equal to a period of the second control signal times the number of translational device movement steps.

17. The laser scanning system of claim 14, wherein an amplitude of the third control signal is variable based on the translational device movement range.

18. The laser scanning system of claim 17, wherein a level of the third control signal increases incrementally after each cycle of the second control signal to the amplitude before returning to a minimum level.

19. The laser scanning system of claim 13, wherein the third control signal is synchronized with the first and second control signals.

* * * * *